(12) United States Patent
Park et al.

(10) Patent No.: US 10,681,287 B2
(45) Date of Patent: Jun. 9, 2020

(54) APPARATUS AND METHOD FOR DISPLAYING AR OBJECT

(71) Applicant: Samsung Electronics Co., Ltd., Suwon-si, Gyeonggi-do (KR)

(72) Inventors: Yerin Park, Seoul (KR); Hyunjoo Kang, Suwon-si (KR); Jiyeon Kwak, Seoul (KR); Yeo-Jun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/121,133

(22) Filed: Sep. 4, 2018

(65) Prior Publication Data

US 2019/0098227 A1    Mar. 28, 2019

(30) Foreign Application Priority Data

Sep. 26, 2017 (KR) .................. 10-2017-0123973

(51) Int. Cl.
| | |
|---|---|
| *H04N 5/272* | (2006.01) |
| *G06K 9/00* | (2006.01) |
| *H04N 5/247* | (2006.01) |
| *H04N 5/262* | (2006.01) |
| *H04N 5/232* | (2006.01) |
| *G06T 19/00* | (2011.01) |

(52) U.S. Cl.
CPC ......... *H04N 5/272* (2013.01); *G06K 9/00221* (2013.01); *G06K 9/00671* (2013.01); *H04N 5/232* (2013.01); *H04N 5/23293* (2013.01); *H04N 5/247* (2013.01); *H04N 5/2621* (2013.01); *H04N 5/2723* (2013.01); *G06T 19/006* (2013.01)

(58) Field of Classification Search
CPC ....................................................... H04N 5/272
USPC ........................................................ 348/239
See application file for complete search history.

(56) References Cited

U.S. PATENT DOCUMENTS

| | | | |
|---|---|---|---|
| 9,674,047 B2* | 6/2017 | Fein ................. | G06F 3/048 |
| 2012/0223967 A1 | 9/2012 | Mann et al. | |
| 2013/0147837 A1 | 6/2013 | Stroila | |
| 2013/0307874 A1 | 11/2013 | Blanchflower et al. | |
| 2014/0225898 A1* | 8/2014 | Fyke ................. | G06T 11/00 345/473 |
| 2016/0335981 A1 | 11/2016 | Koo et al. | |

FOREIGN PATENT DOCUMENTS

KR         10-1455236 B1    11/2014

* cited by examiner

*Primary Examiner* — Joel W Fosselman
(74) *Attorney, Agent, or Firm* — Jefferson IP Law, LLP

(57) ABSTRACT

A method and electronic device for displaying an augmented reality (AR) object recognized by the electronic device are provided. The electronic device includes a display, a memory including stored instructions, and at least one processor. The at least one processor is coupled with the memory and the display. The at least one processor is configured to execute the stored instructions so as to identify a first object on a preview acquired from a first camera, and display a first AR object related with the first object on the preview, and in response to obtaining an input for converting from the first camera to a second camera, store information about the first AR object, and display a second AR object which is related with a second object comprised in a preview of the second camera and the information about the first AR object, on the preview of the second camera.

20 Claims, 19 Drawing Sheets

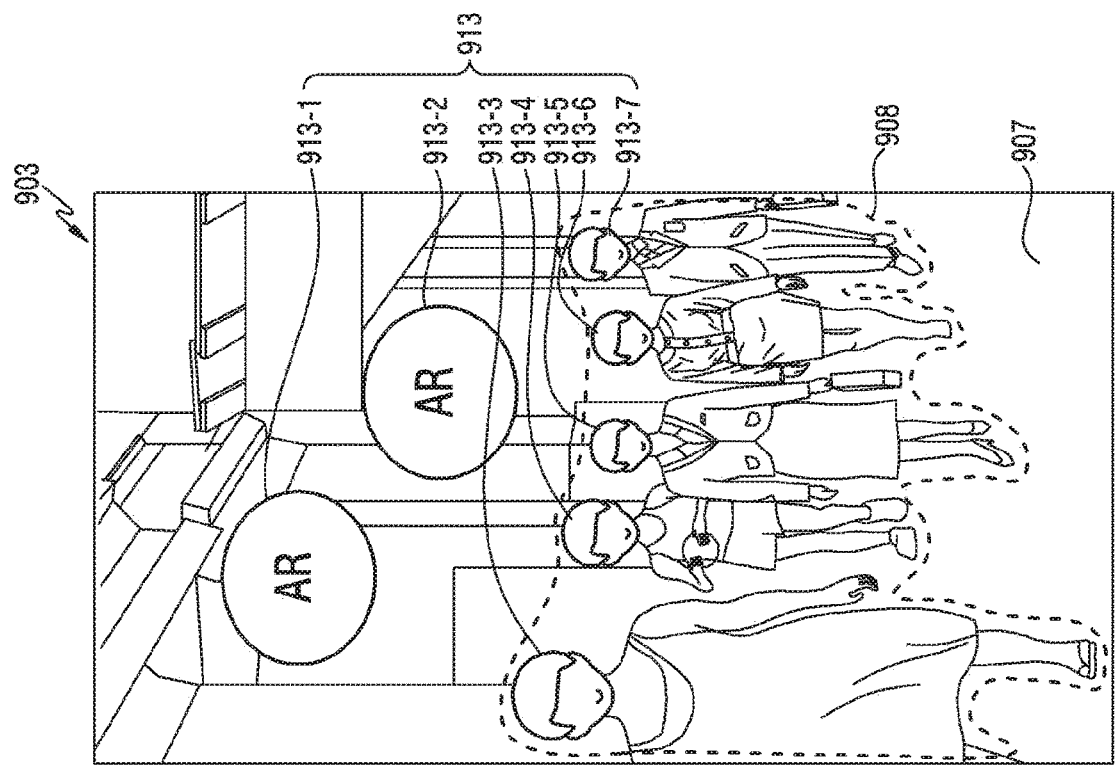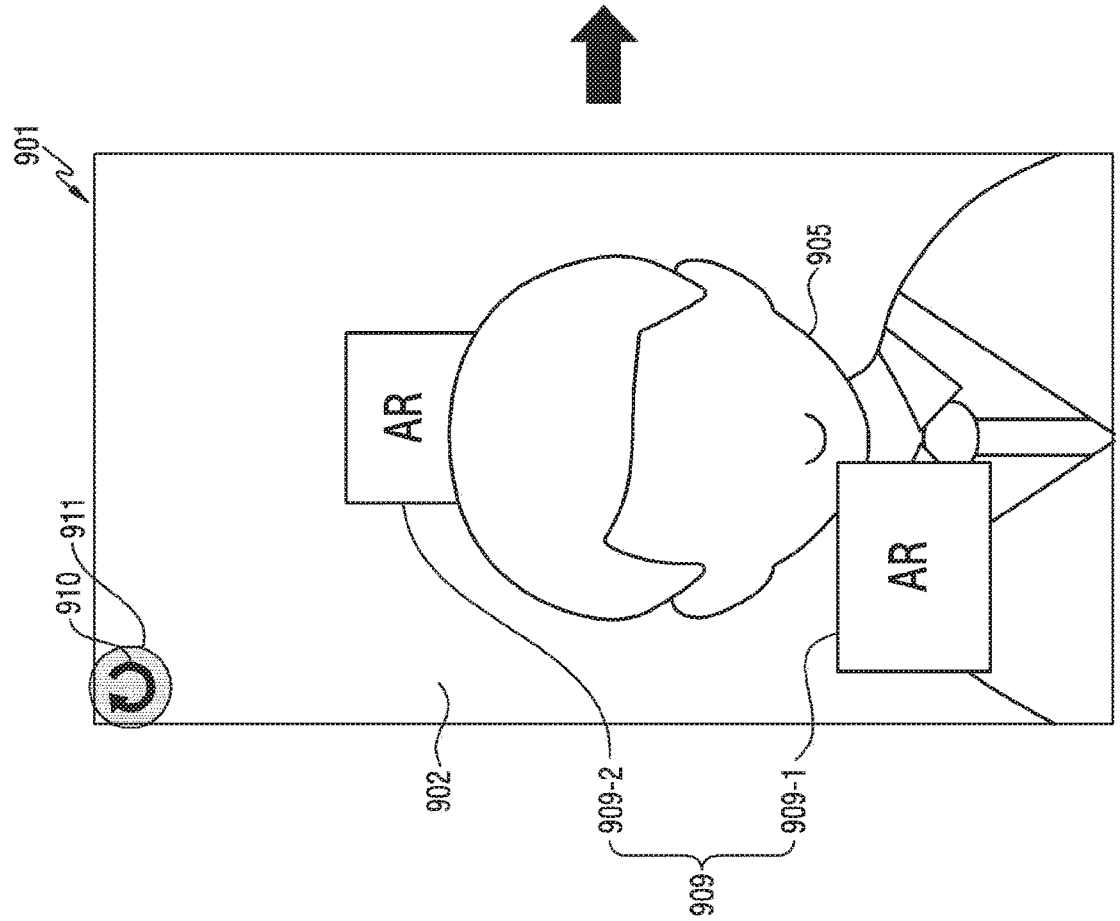
FIG. 9

APPARATUS AND METHOD FOR DISPLAYING AR OBJECT

CROSS-REFERENCE TO RELATED APPLICATION(S)

This application is based on and claims priority under 35 U.S.C. § 119(a) of a Korean patent application number 10-2017-0123973, filed on Sep. 26, 2017, in the Korean Intellectual Property Office, the disclosure of which is incorporated by reference herein in its entirety.

BACKGROUND

1. Field

The disclosure relates to a method and electronic device for displaying an augmented reality (AR) object recognized by the electronic device.

2. Description of Related Art

With the development of electronic device technologies, electronic devices can provide various experiences to users of the electronic devices. For example, the electronic device can provide augmented reality (AR) of adding virtual information to the real thing and showing the same. The electronic device can recognize the real thing through a camera, and can display information (e.g., a virtual object) about AR on a preview of the recognized thing. This AR can be provided to the user through a game application or a photo application. For example, the game application can recognize the real thing through the camera, and display a related game character. For another example, the photo application can recognize a face through the camera, and display a virtual object around the face.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory comprising instructions stored thereon, and at least one processor coupled with the memory and the display, wherein the at least one processor is configured to execute the stored instructions so as to identify a first object on a preview acquired from a first camera, display a first augmented reality (AR) object related with the first object on the preview, in response to obtaining an input for converting from the first camera to a second camera, store information about the first AR object and display a second AR object which is related with a second object comprised in a preview of the second camera and the information about the first AR object, on the preview of the second camera.

In accordance with another aspect of the disclosure, a method for an electronic device is provided. The method includes identifying a first object on a preview acquired from a first camera, displaying a first AR object related with the first object on the preview, in response to obtaining an input for converting from the first camera to a second camera, storing information about the first AR object and displaying a second AR object which is related with a second object comprised in a preview of the second camera and the information about the first AR object, on the preview of the second camera.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates a further example of a UI for displaying an AR object according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
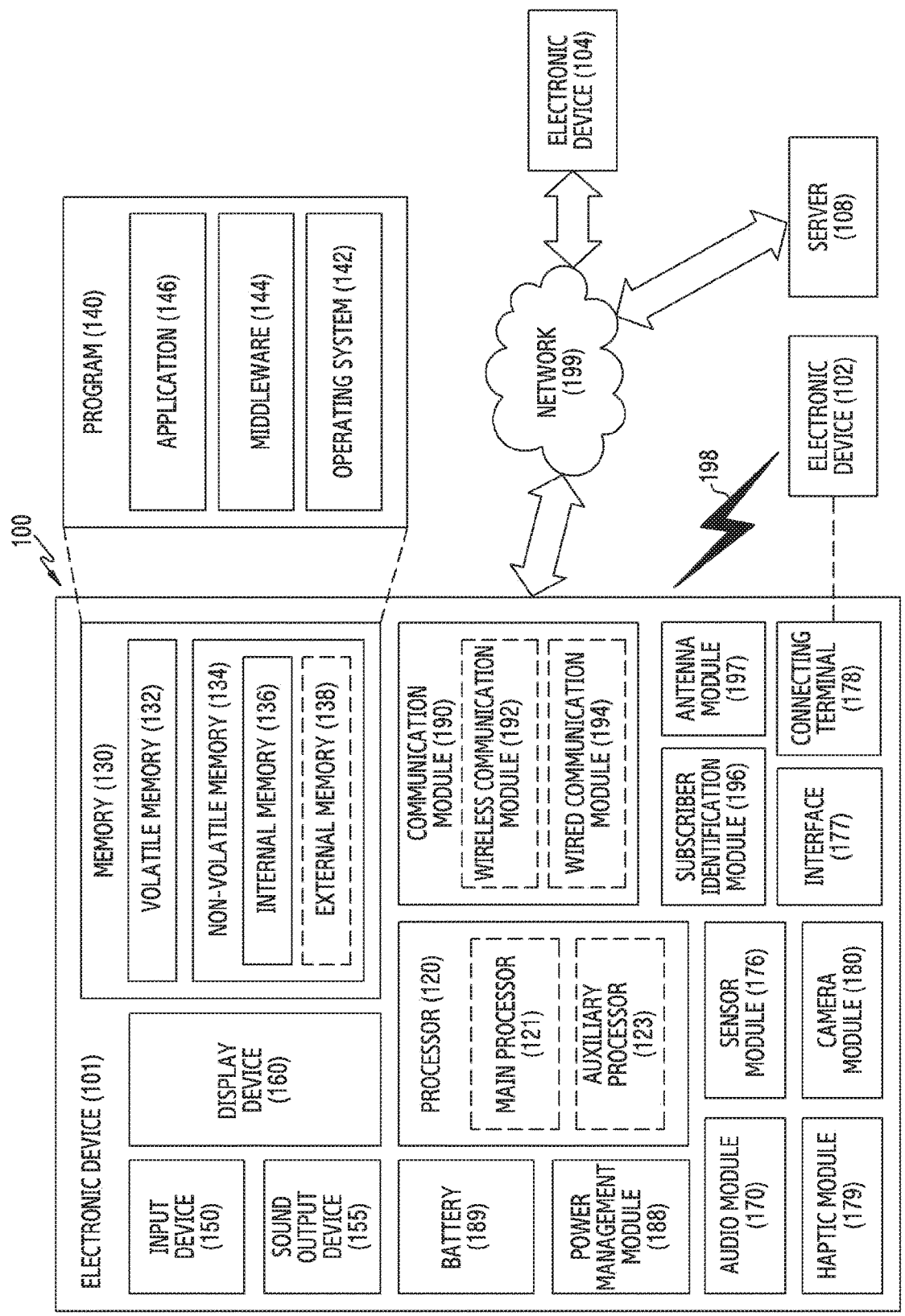
FIG. 1 is a block diagram of an electronic device within a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
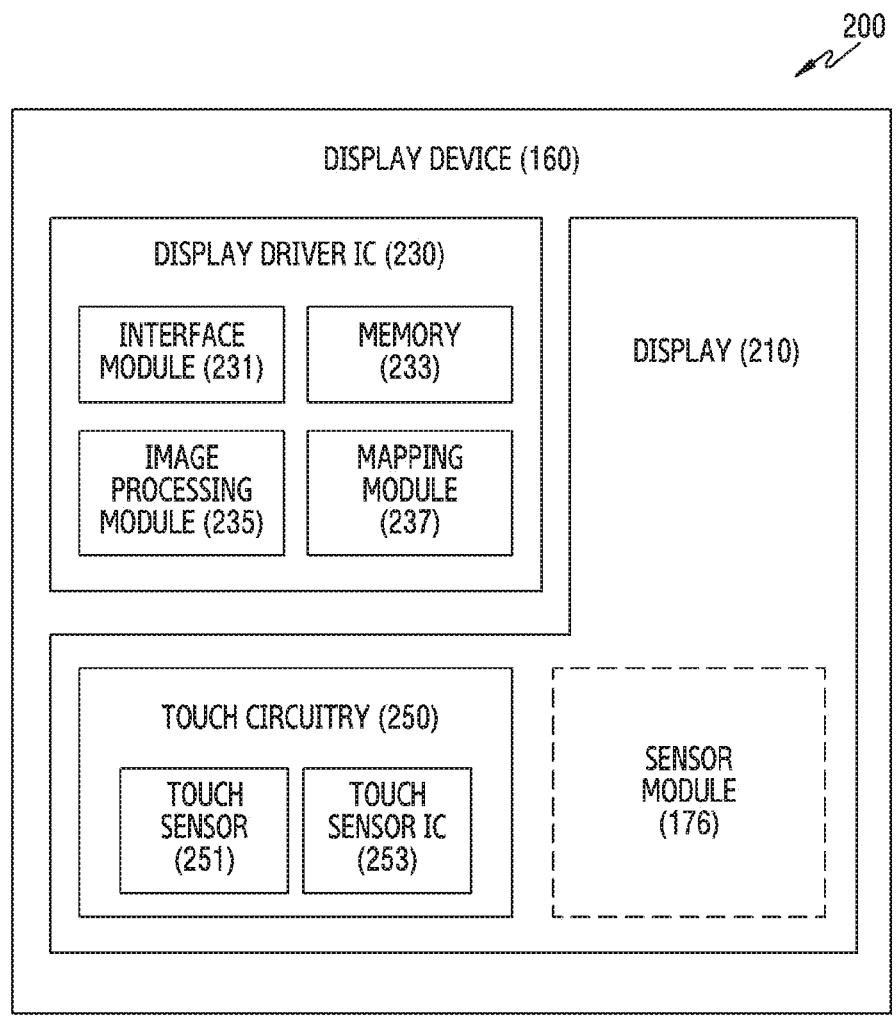
FIG. 2 is a block diagram of a display module according to various embodiments of the disclosure.

FIG. 2 is a block diagram 200 illustrating the display device 160 according to various embodiments of the disclosure.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a GPU) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as a red-green-blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
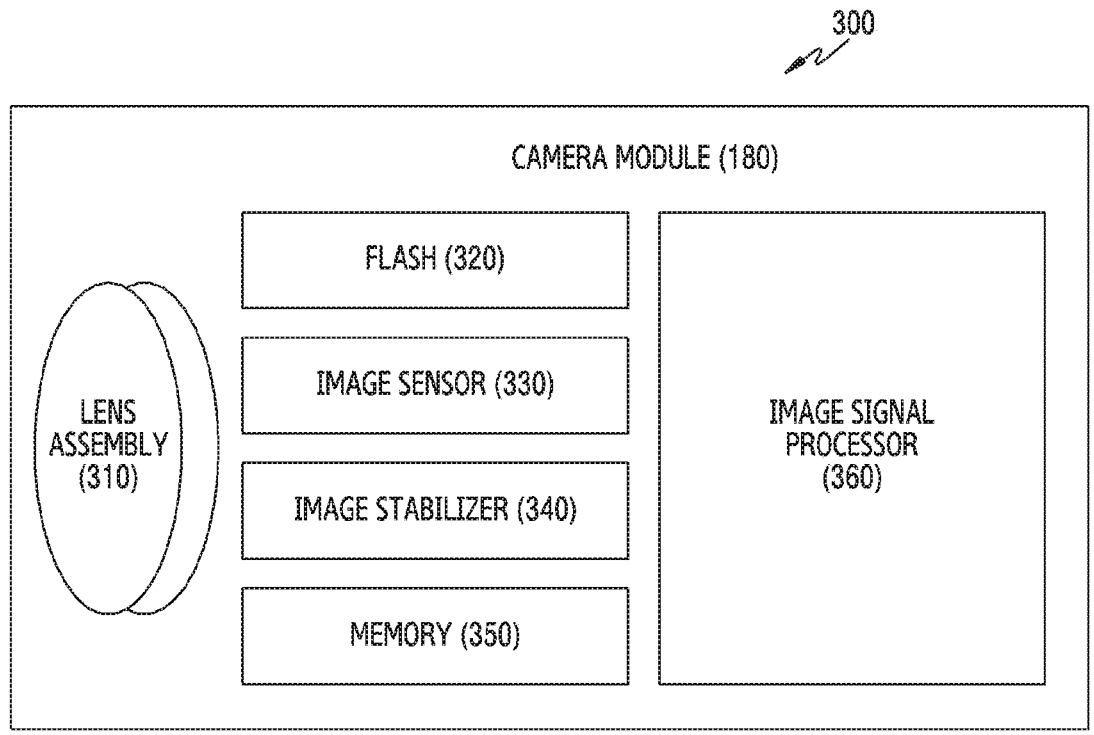
FIG. 3 is a block diagram of a camera module according to various embodiments of the disclosure.

FIG. 3 is a block diagram 300 illustrating the camera module 180 according to various embodiments of the disclosure.

Referring to FIG. 3, the camera module 180 may include a lens assembly 310, a flash 320, an image sensor 330, an image stabilizer 340, memory 350 (e.g., buffer memory), or an ISP 360. The lens assembly 310 may collect light emitted or reflected from an object whose image is to be taken. The lens assembly 310 may include one or more lenses. According to an embodiment, the camera module 180 may include a plurality of lens assemblies 310. In such a case, the camera module 180 may form, for example, a dual camera, a 360-degree camera, or a spherical camera. Some of the plurality of lens assemblies 310 may have the same lens attribute (e.g., view angle, focal length, auto-focusing, f number, or optical zoom), or at least one lens assembly may have one or more lens attributes different from those of another lens assembly. The lens assembly 310 may include, for example, a wide-angle lens or a telephoto lens.

The flash 320 may emit light that is used to reinforce light reflected from an object. According to an embodiment, the flash 320 may include one or more light emitting diodes (LEDs) (e.g., a RGB LED, a white LED, an IR LED, or an ultraviolet (UV) LED) or a xenon lamp. The image sensor 330 may obtain an image corresponding to an object by converting light emitted or reflected from the object and transmitted via the lens assembly 310 into an electrical signal. According to an embodiment, the image sensor 330 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 330 may be implemented using, for example, a charged coupled device (CCD) sensor or a complementary metal oxide semiconductor (CMOS) sensor.

The image stabilizer 340 may move the image sensor 330 or at least one lens included in the lens assembly 310 in a particular direction, or control an operational attribute (e.g., adjust the read-out timing) of the image sensor 330 in response to the movement of the camera module 180 or the electronic device 101 including the camera module 180. This allows compensating for at least part of a negative effect (e.g., image blurring) by the movement on an image being captured. According to an embodiment, the image stabilizer 340 may sense such a movement by the camera module 180 or the electronic device 101 using a gyro sensor (not shown) or an acceleration sensor (not shown) disposed inside or outside the camera module 180. According to an embodiment, the image stabilizer 340 may be implemented, for example, as an optical image stabilizer.

The memory 350 may store, at least temporarily, at least part of an image obtained via the image sensor 330 for a subsequent image processing task. For example, if image capturing is delayed due to shutter lag or multiple images are quickly captured, a raw image obtained (e.g., a Bayer-patterned image, a high-resolution image) may be stored in the memory 350, and its corresponding copy image (e.g., a low-resolution image) may be previewed via the display device 160. Thereafter, if a specified condition is met (e.g., by a user's input or system command), at least part of the raw image stored in the memory 350 may be obtained and processed, for example, by the ISP 360. According to an embodiment, the memory 350 may be configured as at least part of the memory 130 or as a separate memory that is operated independently from the memory 130.

The ISP 360 may perform one or more image processing with respect to an image obtained via the image sensor 330 or an image stored in the memory 350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 360 may perform control (e.g., exposure time control or read-out timing control) with respect to at least one (e.g., the image sensor 330) of the components included in the camera module 180. An image processed by the ISP 360 may be stored back in the memory 350 for further processing, or may be provided to an external component (e.g., the memory 130, the display device 160, the electronic device 102, the electronic device 104, or the server 108) outside the camera module 180. According to an embodiment, the ISP 360 may be configured as at least part of the processor 120, or as a separate processor that is operated independently from the processor 120. If the ISP 360 is configured as a separate processor from the processor 120, at least one image processed by the ISP 360 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
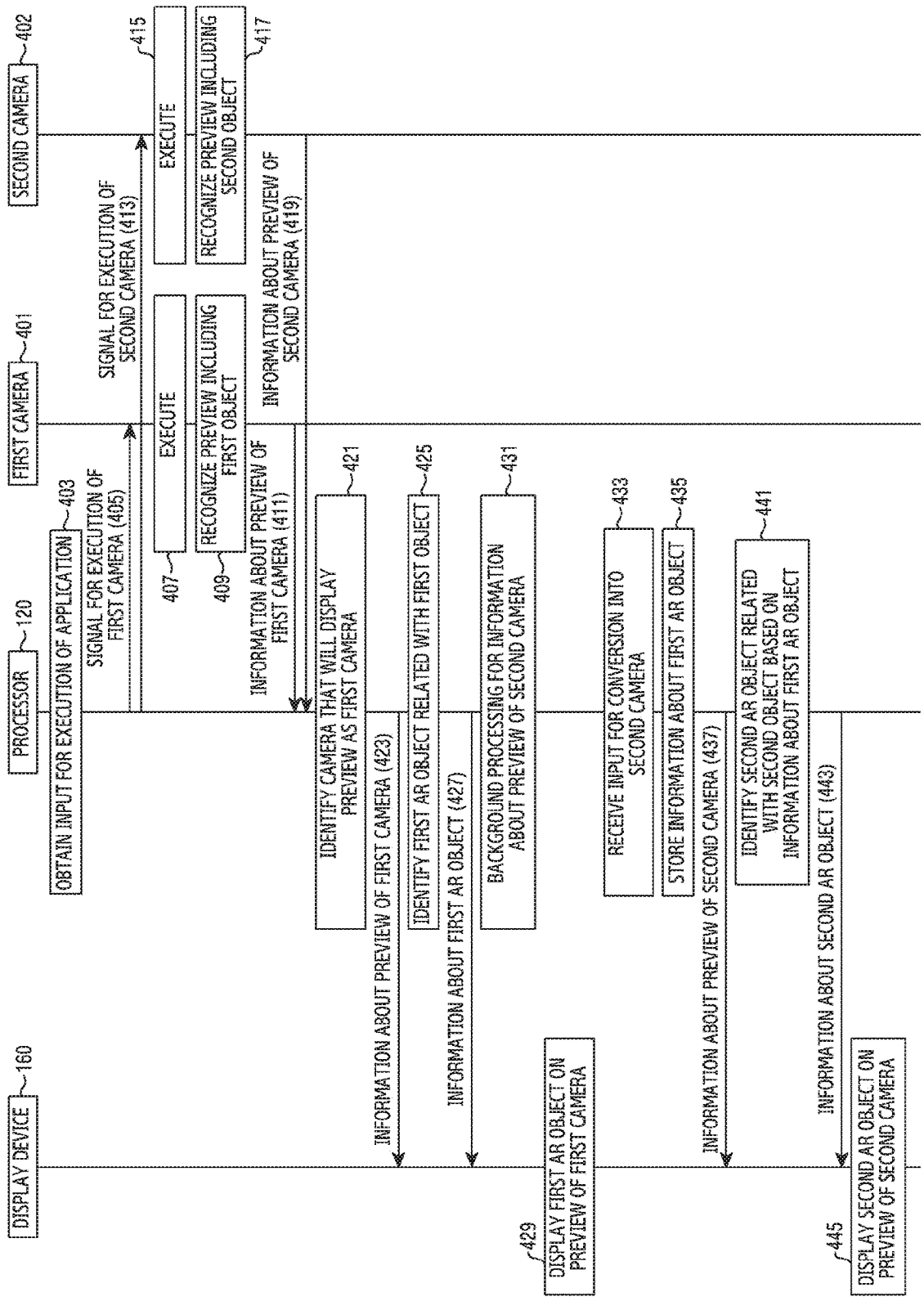
FIG. 4 illustrates an example of a signal flow of an electronic device for displaying an augmented reality (AR) object according to various embodiments of the disclosure.

FIG. 4 illustrates an example of a signal flow of an electronic device for displaying an augmented reality (AR) object according to various embodiments of the disclosure.

For description convenience's sake, exemplified are a term, a constituent element, etc. denoting an AR object (e.g., a final AR object and/or a recommendation AR object) used in the following description. Accordingly, the disclosure is not limited to the terms described later, and may use other terms having equivalent technological meanings.

In various embodiments, the electronic device 101 may include the processor 120, the display device 160, a first camera 401 or a second camera 402. The processor 120, the display device 160, the first camera 401 or the second camera 402 may be coupled with one another. For example, at least some of the processor 120, the display device 160, the first camera 401 or the second camera 402 may be directly connected to one another. For another example, at least some of the processor 120, the display device 160, the first camera 401 or the second camera 402 may be indirectly connected to one another through another device or circuitry.

In various embodiments, the first camera may be a rear camera, and the second camera may be a front camera. However, the disclosure is not limited to the aforementioned example, and may identify any one of two cameras which are included in or connected with the electronic device 101, as the first camera, and identify the other one as the second camera.

In various embodiments, the processor 120 may be configured to execute instructions stored in the memory 130 in order to execute a function of at least one constituent element included in the electronic device 101. For example, the processor 120 may be configured to execute the stored instructions so as to enable the first camera 401 or the second camera 402 to acquire an image.

In operation 403, the processor 120 may obtain an input for execution of an application installed (or stored) in the electronic device 101. The application may be for displaying an AR object. The input for execution of the application may be an input that a user of the electronic device 101 touches an application icon displayed on the display 210. The input of touching the application icon may include at least one of a tap, a double tap, a drag and drop, or a long tap, and is not limited to the aforementioned example. By obtaining the input to the application, the processor 120 may execute the application.

In various embodiments, the application may be an application programmed to show AR, i.e., an application based on AR. For example, the application may be an AR based camera application or an AR based game application. Here, the AR may refer an image (or picture) provided by a technology of overlaying and showing real images or 3D virtual images as one image.

In operation 405, the processor 120 may transmit a signal for executing the first camera 401 to the first camera 401. In response to the application being executed, the processor 120 may transmit a signal for execution of the first camera 401 to the first camera 401.

In operation 407, the first camera 401 may be executed. In response to receiving the signal of operation 405, the first camera 401 may turn On.

In operation 409, the first camera 401 may recognize (or acquire) a preview including a first object. The first camera 401 is executed in operation 407, whereby the first camera 401 may acquire an image. The acquired image may include the first object, and the first object may be a previously given object or thing. The acquired image may be displayed in the form of a preview for previewing scenes recognized through the first camera 401 within a user interface (UI) of the electronic device 101.

In various embodiments, the first object may be a target object for showing AR, and information about the first object may be stored in a server related with AR (or an AR based application). The information about the first object may, for example, be at least one of a location, color, shape, form or size of the first object.

Though not illustrated, in various embodiments, the electronic device 101 may be connected with the server related with the application. The first object may be previously given, and the information about the first object may have been stored in the memory 130 or the server. For example, the information about the first object may be stored in the server, and an image acquired based on a connection between the electronic device 101 and the server may be identified, whereby the first object may be identified.

In operation 411, the first camera 401 may transmit information about a recognized preview to the processor 120. The first camera 401 may continuously recognize the preview, thereby refining the recognized preview, and may transmit information about the refined preview to the processor 120 in real time.

In operation 413, the processor 120 may transmit a signal for execution of the second camera 402 to the second camera 402. In response to the application being executed, the processor 120 may transmit a signal for execution of the first camera 401 to the first camera 401.

In operation 415, the second camera 402 may be executed. In response to receiving the signal of operation 413, the second camera 402 may turn On.

In operation 417, the second camera 402 may recognize (or acquire) a preview including a second object. The second object may be an object or thing included within the preview recognized through the second camera 402. The second object may be previously given, and information about the second object may have been stored in the memory 130 or the server. For example, the information about the second object may be stored in the server, and an image acquired based on a connection between the electronic device and the server may be identified, whereby the second object may be identified.

Though not illustrated, in various embodiments, the electronic device 101 may be connected with the server related with the application. The second object may be previously given, and the information about the second object may have been stored in the memory 130 or the server of the application. For example, the information about the second object may be stored in the server, and an image acquired based on the connection between the electronic device and the server may be identified, whereby the second object may be identified.

In operation 419, the second camera 402 may transmit information about the recognized preview to the processor 120. The second camera 402 may continuously recognize the preview, thereby refining the recognized preview, and may transmit information about the refined preview to the processor 120 in real time.

In operation 421, the processor 120 may identify, as the first camera 401, a camera that will display a preview. In various embodiments, the processor 120 may identify whether it has ever used the first camera 401 formerly, in relation with execution of an application. In response to having ever used the first camera 401 formerly, the processor 120 may identify, as the first camera 401, the camera that will display the preview. Or, in response to having ever used the second camera 402 formerly, the processor 120 may identify, as the second camera 402, the camera that will display the preview. To help the understanding of the disclosure, the following description is made in which the first camera 401 is executed, but the disclosure is not limited to the description. According to various embodiments, in response to not having ever used the first camera 401 formerly, the processor 120 may identify a camera of a usage history, as the camera that will display the preview. In response to there not being the camera usage history in relation with the application, the processor 120 may identify the camera that will display the preview, as the first camera 401. In other words, the processor 120 may identify the camera that will display the preview, based on the usage history. In response to there not being the usage history (e.g., in response to a default value), the processor 120 may identify the first camera 401 as the camera that will display the preview.

In operation 423, the processor 120 may transmit the information about the preview of the first camera 401 to the display device 160. In response to receiving information about an image recognized through the first camera 401, the processor 120 may forward the received information to the display device 160.

In operation 425, the processor 120 may identify a first AR object related with the first object. The processor 120 may identify the first object, and may identify the first AR object corresponding to the first object. Information about the first object may have been stored in the memory 130 or the server of the application, and the processor 120 may identify the first object through a connection with the memory 130 or the server of the application. The first AR object related with the first object may have been previously given (or mapped) and stored in the memory 130 or the server of the application. The processor 120 may identify the first AR object through the connection with the memory 130 or the server of the application.

In various embodiments, in response to the first object being a model indicating an Olympic mark, the first AR object may be an Olympic medal image. In some embodiments, in response to the first object being a model indicating an Olympic character, the first AR object may be an Olympic character image. In other some embodiments, in response to the first object being a face of a person, the first AR object may be a hat image displayed at an upper end part of the first object.

In operation 427, the processor 120 may transmit information about the first AR object to the display device 160. In response to identifying the first AR object related with the first object, the processor 120 may transmit information for displaying the first AR object to the display device 160. The information transmitted to the display device 160 may be at least one of a shape of the first AR object, a form, a color, or a display location.

In operation 431, the processor 120 may process, at a background, the information about the preview of the second camera. The processor 120 may continuously receive the information about the preview of the second camera from the second camera that is a camera in which a preview is not displayed. The processor 120 may process, at the background, the received information about the preview of the second camera. Operation of processing the information about the preview of the second camera may correspond to operation (e.g., operation 425, operation 431) for the preview of the first camera.

In various embodiments, operation 425 and operation 431 may be performed simultaneously or in parallel. In response to the second camera not being identified as the camera that will display the preview, operation 431 may be continuously performed during the execution of the application.

In operation 429, the display device 160 may display the first AR object on the preview of the first camera. The display device 160 may display the first AR object on the preview of the first camera, together (or in superposition). In some embodiments, the first AR object may be displayed in association with the first object included in the preview of the first camera. For example, in response to the first object being a sculpture located in the middle of the preview, the first AR object may be displayed around the first object in the form of surrounding the first object. In other some embodiments, the first AR object may be displayed in a previously given location. For example, the first AR object may be displayed in the middle of the preview of the first camera, regardless of a location of the first object.

In operation 433, the processor 120 may receive (or obtain) an input for conversion into the second camera. The input for conversion into the second camera may include inputs of various schemes. In some embodiments, the processor 120 may obtain an input to a preview screen of the first camera. For example, the processor 120 may obtain a user's input of touching an icon indicating camera conversion, included in the preview screen of the first camera. In other some embodiments, the processor 120 may recognize a user's voice, and may identify the recognized voice and identify camera conversion or non-conversion. For example, though not illustrated, the electronic device 101 may include a microphone for recognizing a voice (or be connected with the microphone), and the processor 120 may recognize (or acquire) a user's voice "Convert the camera" through the microphone. The processor 120 may identify the recognized voice, and identify to convert the camera.

In operation 435, the processor 120 may store the information about the first AR object. Operation 433 and operation 435 may be performed simultaneously or in parallel. In some embodiments, the stored information may include information about the object that is identified to display the first AR object. In other some embodiments, the stored information may include information about at least one of a shape of the first AR object, a form, a color, a size, or a display location. In other some embodiments, the stored information may be information about a keyword indicating the AR object.

In operation 437, the processor 120 may transmit the information about the preview of the second camera 402 to the display device 160.

In operation 441, the processor 120 may identify a second AR object related with the second object, based on the information about the first AR object. The second AR object may be an AR object which is related with the first AR object and the second object. For example, the first AR object may be a virtual image indicating an Olympic medal, and the second object may be a face of a person. In this case, the second AR object may be a virtual medal image displayed at a lower end of the face of the person. In various embodiments, the second AR object may be mapped with the first AR object and the second object and be stored in the memory 130 or the server of the application. The processor 120 may identify the second AR object through the memory 130 or the server of the application, based on that the information about the first AR object and the second object are identified.

In operation 443, the processor 120 may transmit information about the second AR object to the display device 160. The second AR object may be displayed on the preview of the second camera 402. In various embodiments, the information about the second AR object may include information about at least one of a size of the second AR object, a shape, a location, or a color. For example, in response to the second AR object being a medal shape image, the information about the second AR object may be location information or location data for displaying at a lower end which is spaced a specific distance or more apart from the face of the person included in a preview image.

In operation 445, the display device 160 may display the second AR object on the preview of the second camera. The display device 160 may display, on the preview of the second camera, the second AR object corresponding to the information about the second AR object received from the processor 120. The display device 160 may display the second AR object, together (or in superposition) with the object included in the preview of the second camera.

In various embodiments, the electronic device 101 may include a display (or the display device 160), the memory 130 including stored instructions, and at least one processor. The at least one processor may be connected with the memory 130 and be configured to execute the stored instructions so as to identify a first object on a preview acquired from the first camera 401, and display a first AR object related with the first object on the preview, and in response to obtaining an input for converting from the first camera 401 to the second camera 402, store information about the first AR object, and display a second AR object which is related with a second object included in a preview of the second camera 402 and the information about the first AR object, on the preview of the second camera 402.

In various embodiments, a method of the electronic device 101 may include identifying a first object on a preview acquired from the first camera 401, displaying a first AR object related with the first object on the preview, and in response to obtaining an input for converting from the first camera 401 to the second camera 402, storing information about the first AR object, and displaying a second AR object which is related with a second object included in a preview of the second camera 402 and the information about the first AR object, on the preview of the second camera 402.

Figure 5:
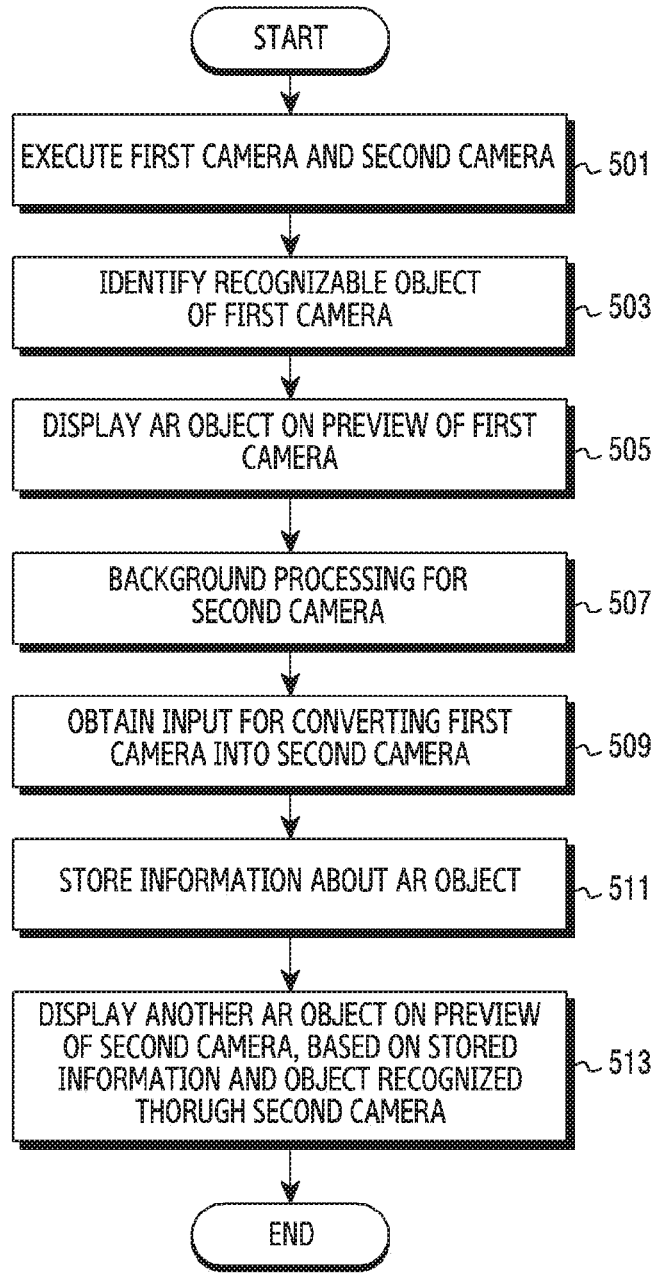
FIG. 5 illustrates an example of an operation of an electronic device for displaying an AR object according to various embodiments of the disclosure.

FIG. 5 illustrates an example of a flow of an operation of an electronic device for displaying an AR object according to various embodiments of the disclosure. FIG. 5 shows the operation of the electronic device simultaneously executing a plurality of cameras for the sake of execution of an application.

In operation 501, the processor 120 may execute the first camera 401 and the first camera 402. The processor 120 may execute the plurality of cameras included in the electronic device 101 for the sake of execution of the application. For example, in response to operation of executing an AR based camera application, the processor 120 may execute (or turn on) a rear camera (e.g., the first camera 401) and a front camera (e.g., the second camera 402).

In operation 503, the processor 120 may identify a recognizable object of the first camera 401. The processor 120 may acquire an image through the first camera 401. The acquired image may be an image corresponding to a scene that a direction of a lens included in the first camera 401 faces. The scene may include a plurality of objects (or things), and the processor 120 may identify the image corresponding to the scene, thereby identifying the plurality of objects included in the scene. The plurality of objects may include at least one recognizable object, and the processor 120 may identify the plurality of objects, thereby identifying a recognizable object. The recognizable object may be previously given, and information about the recognizable object may have been stored in the memory 130 or the server of the application. The processor 120 may identify the recognizable object corresponding to the previously stored information of the recognizable object, based on the previously stored information of the recognizable object.

In various embodiments, according as the processor 120 is connected with the memory 130 or the server of the application, the processor 120 may identify whether the at least one object included in the plurality of objects corresponds to the recognizable object. In response to the at least one object corresponding to the recognizable object, the processor 120 may identify the at least one object as the recognizable object. For example, the processor 120 may identify information such as a location of the at least one object, a size, a shape, a color or the like. The processor 120 may identify whether the identified information corresponds to information about the recognizable object previously stored in the memory 130 or the server of the application.

In various embodiments, in response to there not being the recognizable object within the image acquired by the first camera 401, the processor 120 may repeat or maintain operation 503 until the recognizable object is identified. To identify the recognizable object, the processor 120 may continuously identify an object from the image acquired by the first camera.

In operation 505, the processor 120 may display an AR object on a preview of the first camera 401. The processor 120 may set a camera for displaying a preview as the first camera. The preview of the first camera may be displayed through the display device 160, and the recognizable object and the AR object may be displayed within the preview of the first camera, together.

In operation 507, the processor 120 may perform background processing for the second camera 402. The processor 120 may continuously identify an image acquired through the second camera 402, regardless of displaying or non-displaying of the preview of the second camera 402. The processor 120 may perform the processing of the second camera 402 in a background state. In various embodiments, operation 507 may be performed simultaneously or in parallel with operation 503 to operation 505.

In operation 509, the processor 120 may obtain an input for converting the first camera 401 to the second camera 402. For example, the processor 120 may obtain a user's input of clicking an icon which is displayed for screen conversion on the preview of the first camera 401, thereby changing a camera for preview from the first camera 401 to the second camera 402.

In operation 511, the processor 120 may store information about the AR object displayed on the preview of the first camera 401. The processor 210 may store whether the AR object related with the recognizable object of the first camera indicates which information. In some embodiments, the stored information may include information about an object that is identified to display the first AR object. In other some embodiments, the stored information may include information about a shape of the AR object, a form, a color, a size, or a display location. In other some embodiments, the stored information may be information about a keyword indicating the AR object. For example, in response to the AR object being an Olympic medal shape icon, the processor 120 may store a keyword 'Olympic'. For another example, in response to the AR object being the Olympic medal shape icon, the processor 120 may store the information about the shape of the AR object, the form, the color, the display location, the size or the like.

In operation 513, the processor 120 may display another AR object on the preview of the second camera 402, based on the stored information about the AR object and the object recognized through the second camera 402. Information about the another AR object may have been previously stored in the memory 130 or the server. The processor 120 may analyze the stored AR object and the object recognized through the second camera, thereby identifying the another AR object which is related with the stored AR object and the object recognized through the second camera. For example, the processor 120 may obtain a keyword 'Olympic' by analyzing the stored information about the AR object, and may obtain a keyword 'face' by analyzing the object recognized through the second camera. The processor 120 may identify another AR object which includes two keywords 'Olympic' and 'face'. Here, the another AR object may be an Olympic medal displayed at a lower end part of the face.

Figure 6:
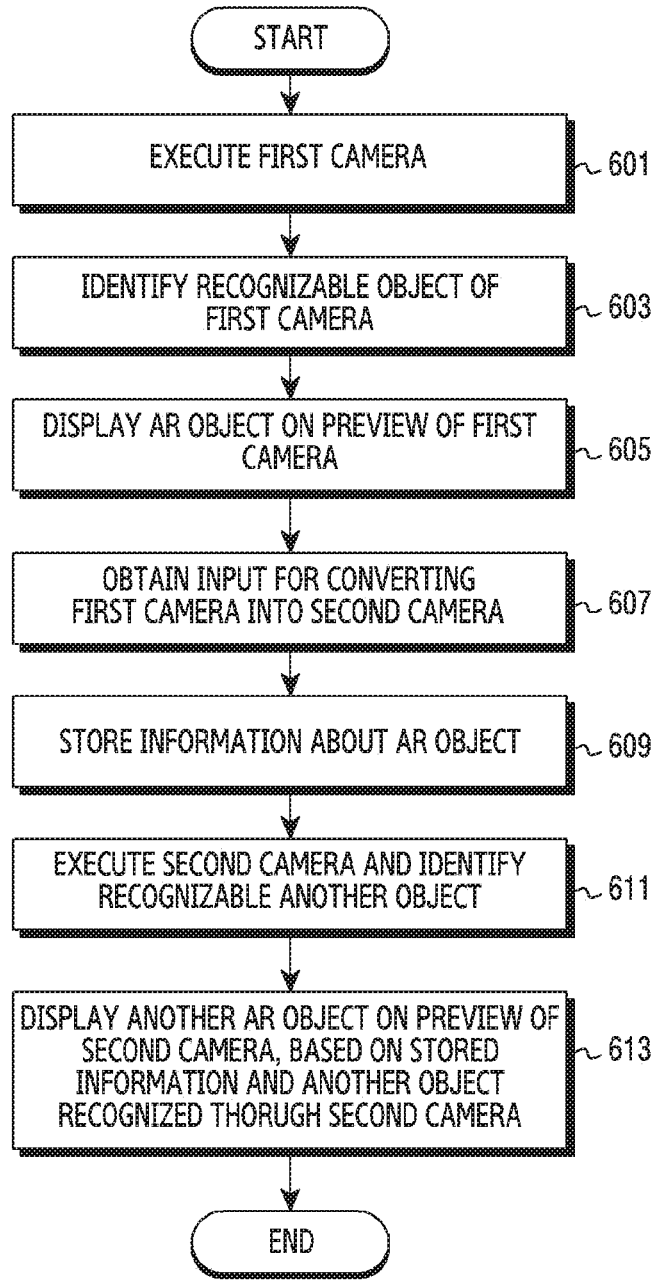
FIG. 6 illustrates another example of an operation of an electronic device for displaying an AR object according to various embodiments of the disclosure.

FIG. 6 illustrates another example of an operation of an electronic device for displaying an AR object according to various embodiments of the disclosure. FIG. 6 shows the operation of the electronic device executing one camera for the sake of execution of an application.

In operation 601, the processor 120 may execute the first camera. The processor 120 may execute one camera among a plurality of cameras included in the electronic device 101 for the sake of execution of an application. For example, in response to operation of executing an AR based camera application, the processor 120 may execute (or turn on) a rear camera. The executed camera may be identified by a usage history of the application. For example, the processor 120 may store the usage history of the application, and may identify that a camera most recently used in relation with the application is the rear camera. The processor 120 may identify, as the rear camera, a camera that will be executed in response to the execution of the application, based on the identifying. In response to there not being the usage history of the application, the electronic device 101 may basically identify the rear camera as the camera that will be executed in response to the execution of the application.

In operation 603, the processor 120 may identify a recognizable object of the first camera. The processor 120 may acquire an image through the first camera 401, and identify at least one object included in the acquired image. The processor 120 may identify whether the recognizable object related with the application has been included among at least one or more objects.

In various embodiments, information about the recognizable object may have been previously stored in the memory 130 or the server of the application and according as the processor 120 is connected with the memory 130 or the server of the application, the processor 120 may identify whether at least one object corresponds to the recognizable object. In response to the at least one object corresponding to the recognizable object, the processor 120 may identify the at least one object as the recognizable object. For example, the processor 120 may identify information such as a location of the at least one object, a size, a shape, a color or the like. The processor 120 may identify whether the identified information corresponds to the information about the recognizable object previously stored in the memory 130 or the server of the application. In various embodiments, operation 603 may correspond to operation 503 of FIG. 5.

In operation 605, the processor 120 may display an AR object on a preview of the first camera 401. Information about the AR object may have been previously stored in the memory 130 or the server of the application. According as the recognizable object is identified, the processor 120 may identify AR object corresponding to the recognizable object. The identified AR object may be displayed on the preview of the first camera. Operation 605 may correspond to operation 505 of FIG. 5.

In operation 607, the processor 120 may obtain an input for converting the first camera 401 into the second camera 402. For example, by obtaining a user's input of clicking an icon which is displayed for screen conversion on the preview of the first camera, the processor 120 may change a camera for preview from the first camera 401 to the second camera 402. Operation 607 may correspond to operation 509 of FIG. 5. In operation 609, the processor 120 may store information about the AR object displayed on the preview of the first camera 401.

In operation 611, the processor 120 may execute the second camera, to identify a recognizable another object. In response to receiving the input for converting the camera of operation 609, the processor 120 may execute the second camera 402. The processor 120 may acquire an image through the second camera 402, and may identify a recognizable another object included in the acquired image. The recognizable another object may be an object different from the recognizable object of the first camera 401. For example, the recognizable object of the first camera 401 may be an Olympic sculpture, and the recognizable another object of the second camera 402 may be a face. A detailed operation of identifying the recognizable another object may correspond to operation 603. That is, the processor 120 may identify the recognizable another object included in the image acquired through the second camera 402, in a method corresponding to operation 603.

In operation 613, the processor 120 may display another AR object on the preview of the second camera 402, based on the stored information and the another object recognized through the second camera 402. The processor 120 may identify the another AR object which is related with the AR object stored through operation 609 and the another object recognized through the second camera 402. According as the another AR object is identified, the processor 120 may display the another AR object on the preview of the second camera 402. Operation 613 may correspond to operation 513.

Figure 7:
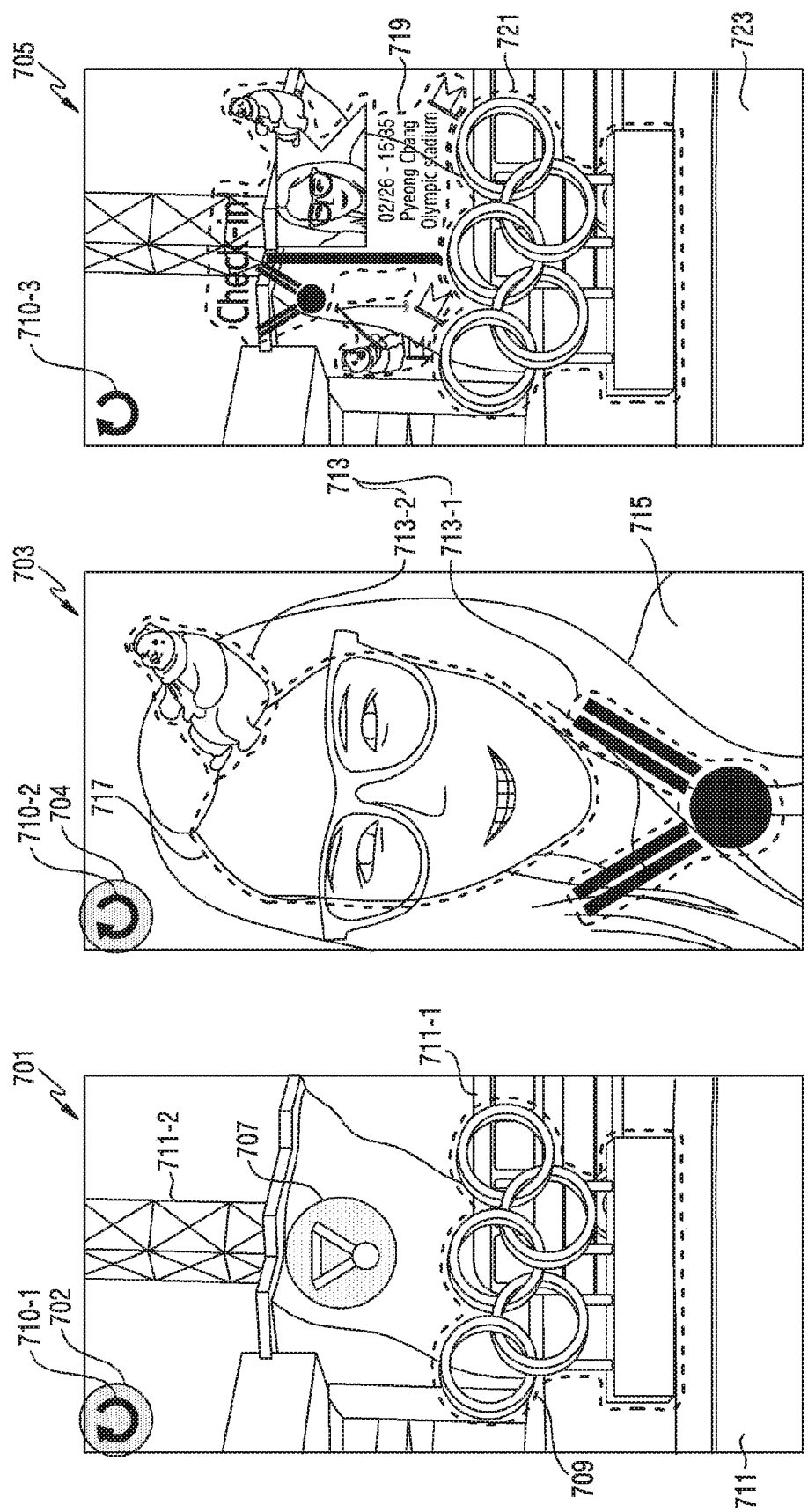
FIG. 7 illustrates an example of a user interface (UI) for displaying an AR object according to various embodiments of the disclosure.

FIG. 7 illustrates an example of a UI according to various embodiments of the disclosure. The processor 120 may provide various UIs 701, 703 and 705 related with an application through the display device 160.

In various embodiments, the UI 701 may include a preview 711, a first object 709, a first AR object 707, and/or an icon 710-1. The preview 711 may be an image acquired through the first camera 401 that turns on by execution of the application. Here, the first camera 401 may be a rear camera. The preview 711 may include a plurality of objects 709, 711-1 and 711-2. The plurality of objects may be divided into the recognizable first object 709 and the non-recognizable objects 711-1 and 711-2. The processor 120 may identify the recognizable first object 709, thereby identifying the first AR object 707 related with the first object 709. The processor 120 may display the icon 710-1 within the UI 701. The icon 710-1 may be for converting a camera related with the preview, and may have been previously given based on the application. The icon 710-1 may be continuously maintained, regardless of a change of the displayed preview.

In various embodiments, the processor 120 may identify a sculpture in which the recognizable object 709 indicates an Olympic mark, thereby identifying the first AR object 707 that is an AR object related with the recognizable object 709. The first AR object 707 may be an icon (or image) having an Olympic medal shape.

In various embodiments, the processor 120 may change a camera for displaying the preview into the second camera, based on obtaining a user's input 702 to the icon 710-1 included in the UI 701. According as the camera for displaying the preview is changed from the first camera to the second camera, the UI 703 may be displayed. The processor 120 may store information about the first AR object 707 concurrently with changing the camera for displaying the preview from the first camera to the second camera, in sequence or regardless of order.

In various embodiments, the user's input 702 may correspond to at least one of inputs of various schemes. For example, the user's input 702 may be at least one of a tap, a double tap or a long tap. In some embodiments, the user's input 702 may have been previously given in relation with the application. In other some embodiments, the user's input 702 may be changed through operation of changing the setting of the application.

Referring to FIG. 7, the UI 703 may include a preview 715, a second object 717, a second AR object 713, and/or an icon 710-2. The preview 715 may be an image acquired through the second camera 402 which turns on according as a camera for displaying the preview is changed. Here, the second camera 402 may be a front camera. The processor 120 may identify the recognizable second object 717 included in the preview 715. The processor 120 may identify the second AR object 713 which is related with the second object 717 and the first AR object 707, based on the stored information about the first AR object 707. The second AR object 713 may be displayed in various schemes. For example, the second AR object 713 may consist of an Olympic medal image 713-1 related with the first AR object and an Olympic character image 713-2. The Olympic medal image 713-1 and the Olympic character image 713-2 may be displayed in mutually different locations, respectively. The processor 120 may display the icon 710-2 within the UI 703. The icon 710-2 may correspond to the icon 710-1 included in the UI 701. In response to a user's input 704 to the icon 710-2 being obtained, the processor 120 may change the camera for displaying the preview into the first camera. The processor 120 may store information about the second AR object 713 concurrently with changing the camera for displaying the preview from the second camera to the first camera, or regardless of order. The user's input 704 may correspond to the user's input 702.

Referring to FIG. 7, the UI 703 may include a preview 723, a third object 721, a third AR object 719, and/or an icon 710-3. The preview 723 may be an image acquired through the first camera 401 which turns on according as a camera for displaying the preview is changed. The processor 120 may identify the recognizable third object 721 included in the preview 723. The processor 120 may identify the third AR object 719 which is related with the third object 721 and the second AR object 707, based on the stored information about the second AR object 713. The processor 120 may display the icon 710-3 within the UI 703. The icon 710-3 may correspond to the icon 710-1 included in the UI 701 or the icon 710-2.

In various embodiments, information for displaying an AR object may be accumulated, and the processor 120 may display the AR object, based on the accumulated information. The UI 701, the UI 703, and the UI 705 may be displayed in sequence, and in this case, the processor 120 may display the UIs, based on information stored in former operations, in the operation of displaying each of the UIs. According as the information used to display the AR object is changed based on the information accumulation, another AR object may be displayed according to the used information, even though a recognizable object is the same. For example, the third object 721 is the same object as the first object 709, but the third AR object 719 may not be the same as the first AR object 707.

In various embodiments, the camera executed according to the execution of the application may be the second camera. In response to the camera executed according to the execution of the application being the second camera, the processor 120 may display the UI 703. In this case, the second AR object 713 may be displayed in such a manner that the first AR object 707 is displayed. In other words, the second AR object 713 may be an AR object related with the second object, which is displayed based on identifying the second object.

Figure 8:
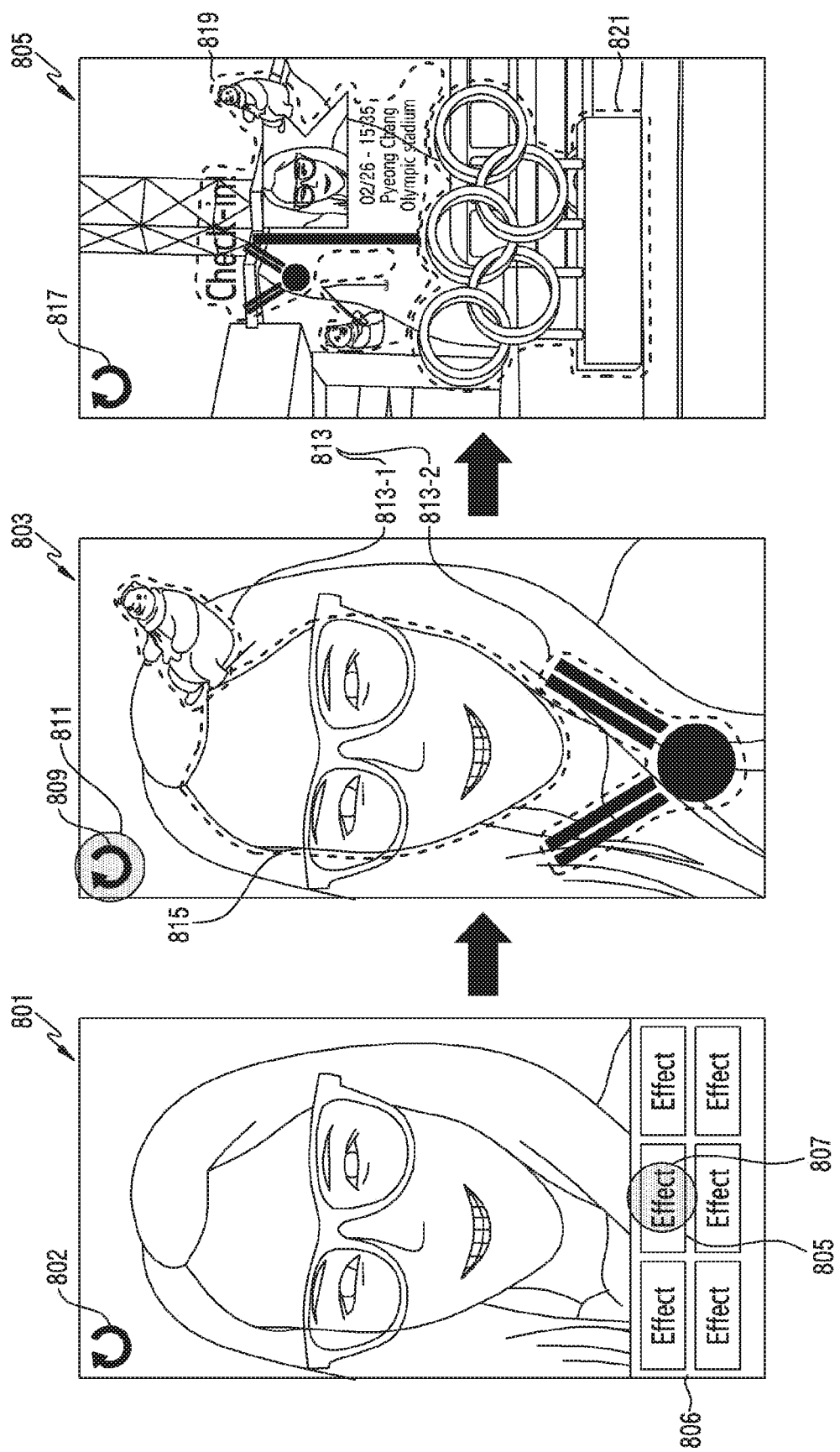
FIG. 8 illustrates another example of a UI for displaying an AR object according to various embodiments of the disclosure.

FIG. 8 illustrates another example of a UI for displaying an AR object according to various embodiments of the disclosure.

Referring to FIG. 8, the electronic device 101 may provide various UIs (e.g., UI 801, UI 803, and UI 805) according to execution of an application.

In various embodiments, the processor 120 may identify the kind (or type) of AR for displaying the UI 801. In relation with the application, various AR objects displayable for one object may have been stored in the memory 130 or a server of the application. Information about the stored various AR objects may be displayed as in a list 803. Six effects displayed in the list 803 may each indicate an effect for showing each different AR object. For example, the six effects may be effects in which colors of the displayed AR objects are each differently set. For another example, the six effects may be effects in which locations of the displayed AR objects are each differently set. For further example, the six effects may be effects in which the respective displayed AR objects are all differently set.

In various embodiments, the list 806 may be displayed to show applicable AR effects in relation with an object included in the UI 801. In some embodiments, the list 806 may be an image which is displayed to receive a user's input in response to a camera for displaying the UI 801 being the front camera. In other some embodiments, the list 806 may be an AR object which is displayed based on that the processor 120 recognizes the object included in the UI 801. In this case, the list 806 may include a plurality of AR objects for showing an applicable plurality of AR effects. The processor 120 may obtain a user's input 807 to one effect 805 among the six effects displayed in the list 806. In response to obtaining the user's input 807, the processor 120 may identify the kind of AR object that will be displayed. To identify the kind of AR object, the user's input 807 may be performed in various schemes. For example, the user's input 807 may correspond to at least one of a tap, a double tap or a long tap. The kind of AR object that will be displayed may correspond to the selected effect 805.

In various embodiments, in response to that the user's input 807 to the UI 801 is obtained, the processor 210 may display the UI 803. For example, in response to the users' input 807 being obtained in a state where the user's face is being displayed on a preview screen through the front camera, the processor 120 may display an AR object 813. The processor 120 may display the related AR object 813, based on the effect 805 and an object 815. For example, the selected effect 805 may be an effect indicating Olympic, and the object 815 included within a preview acquired through the front camera may be a face. The AR object 813 may be an Olympic character image 813-1 displayed at an upper end of the object 815 and an Olympic medal image 813-2 displayed at a lower end of the object 815.

In various embodiments, the processor 120 may obtain a user's input 811 to the UI 803. The user's input 811 may be a touch on an icon 809 included in the UI 803. The icon 809 may be displayed to obtain an input for changing a camera related with the UI 803. According as obtaining the user's input 811 to the icon 809, the processor 120 may change a camera for acquiring a preview in order to display the UI 803, from the front camera to the rear camera.

In various embodiments, the processor 120 may store information about the existing displayed AR object, based on changing the camera for acquiring the preview. For example, the processor 120 may store information about the AR object 813 that is being displayed, based on obtaining the user's input 811 to the UI 803.

In various embodiments, the processor 120 may display the UI 805, based on changing the camera for acquiring the preview image. The UI 805 may be a UI related with a preview acquired through the rear camera. The UI 805 may include a recognizable another object 821. The processor 120 may display another AR object 819, based on identifying the another object 821. The another AR object 819 may be an AR object which is related with the another object 821 and the stored AR object 813.

Referring to FIG. 8, an icon 802, the icon 809 and/or an icon 817 may refer icons for converting a camera. The icon 802, the icon 809 and/or the icon 817 may be the same icon for obtaining a user's input in order to convert the camera.

FIG. 9 illustrates a further example of a UI for displaying an AR object according to various embodiments of the disclosure. FIG. 9 illustrates an example of a UI that is displayed in the electronic device 101 in response to a camera displayed by execution of an application being a front camera.

In various embodiments, according as the application is executed, the processor 120 may display a UI 901. The UI 901 may include a preview 902 acquired through the front camera and an AR object 909. The preview 902 may include a recognizable object 905. In response to identifying the object 905, the processor 120 may identify the AR object 909 for displaying in the UI 901. The identified AR object 909 may consist of a plurality of virtual images 909-1 and 909-2. In accordance with various embodiments, the plurality of virtual images 909-1 and 909-2 may each be the same image or mutually different images. The identified AR object 909 may have been previously given in relation with the object 905, and the AR object 909 is not limited to the aforementioned example.

In various embodiments, in response to receiving a user's input 911 to an icon 910 displayed within the UI 901, a UI 903 may be displayed. In response to receiving the user's input 911 for converting a camera, the processor 120 may store information about the AR object displayed in the UI 901. In some embodiments, the stored information may include information about the object 905 which is identified to display the AR object. In other some embodiments, the stored information may include information about at least one of a shape of the AR object, a form, a color, a size, or a location displayed.

In various embodiments, the UI 903 may include a preview 907 acquired through a rear camera and another AR object 913. The preview 907 may include a recognizable object 908. The processor 120 may display the another AR object 913 within the UI 903, based on the stored information and the object 908. For example, in response to the object 908 being a plurality of persons, the processor 120 may display the another AR object 913 in respective face portions of a plurality of persons and/or a given location. The another AR object 913 may include a plurality of images. Some (e.g., images 913-3 to 913-7) of the plurality of images may be images corresponding to the object 905, and the remaining some (e.g., 913-1 or 913-2) of the plurality of images may be another image into which a shape of the image of the AR object 909 is deformed. By associating the AR object displayed after camera conversion and the AR object before camera conversion, the electronic device 101 may provide an abundant, extended experience to a user of the electronic device 101.

In various embodiments, in response to an object recognized through the front camera being the user, the processor 120 may recognize at least one of an age of the user, a gender or a look, to change an AR object that is displayed by conversion into the rear camera. For example, in response to the gender of the user being a female, a color of the AR object that is being displayed through the rear camera may be changed in order of red, yellow, and violet.

Figure 10:
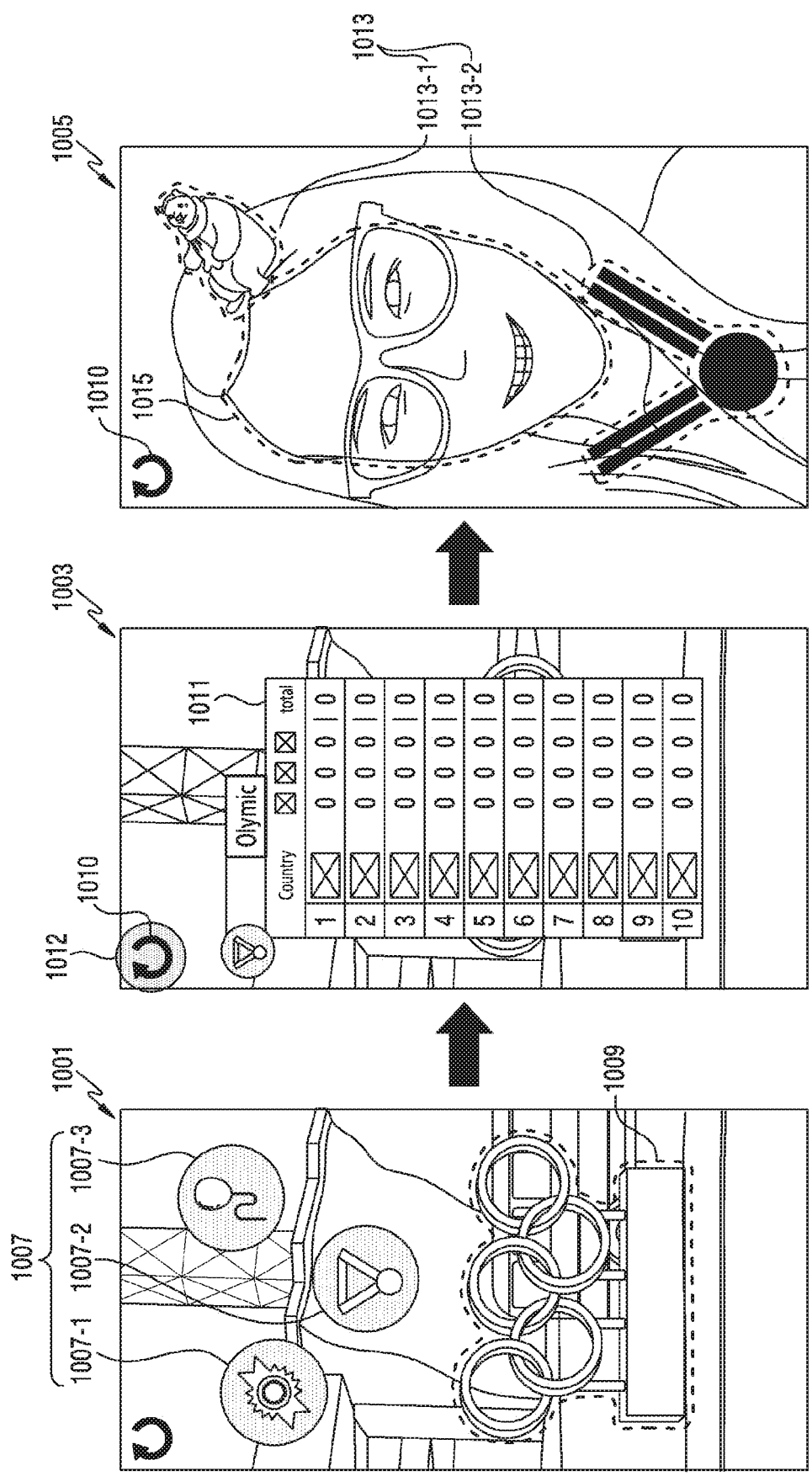
FIG. 10 illustrates a yet another example of a UI for displaying an AR object according to various embodiments of the disclosure.

FIG. 10 illustrates an example of a UI for displaying a recommendation AR object according to various embodiments of the disclosure.

Referring to FIG. 10, a UI 1001 may be a UI which is displayed according as a rear camera for displaying a preview is executed in response to execution of an application. The UI 1001 may include an object 1009 and a plurality of AR objects 1007. The object 1009 may be an object which is previously given to be recognizable in relation with the application. The plurality of AR objects related with the object 1009 may be given, and in this case, information about the plurality of AR objects may be stored in the memory 130 or a server of the application. By identifying the object 1009, the processor 120 may identify the plurality of AR objects, and display the identified plurality of AR objects 1007.

The plurality of AR objects 1007 may include respective AR objects 1007-1, 1007-2 and 1007-3 each having a different attribute or different image. The AR object 1007-1 may be displayed in the form of an icon which includes an Olympic award certificate shape image. The AR object 1007-2 may be displayed in the form of an icon which includes an Olympic medal shape image. The AR object 1007-3 may be displayed in the form of an icon which includes a balloon shape image.

The UI 1003 is a UI of displaying a detailed AR object of one AR object among the plurality of AR objects. In various embodiments, the processor 120 may receive a user's input of selecting one of the plurality of AR objects displayed in the UI 1001. In response to receiving the user's input, the processor 120 may extend an AR object corresponding to the user's input and display the same. Information about the extended AR object may have been previously stored in the memory 130 or a server of the application. For example, the processor 120 may obtain a user's input to the Olympic medal shape AR object 1007-2. In response to obtaining the user's input, the processor 120 may display an extended AR object 1011. The extended AR object may be an Olympic medal list image. In some embodiments, the Olympic medal list image may be previously stored in the memory 130 or the server of the application. In other some embodiments, the Olympic medal list image may be real-time refined through the server of the application. The processor 120 may display the refined image, based on being connected to the server of the application at a time corresponding to obtaining the user's input.

In various embodiments, the processor 120 may receive a user's input 1012 to an icon 1010 included within the UI 1003. The processor 120 may convert a camera for displaying a preview, based on receiving the user's input 1012. For example, the processor 120 may convert the camera for displaying the preview, from the rear camera to the front camera.

Referring to FIG. 10, an AR object 1013 (e.g., 1013-1 and 1013-2) may be displayed within a UI 1005. The AR object 1013 may be an AR object which is related with the extended AR object 1011 and an object 1015 included in the UI 1005.

In various embodiments, in response to information about the extended AR object not having been previously given, the extended AR object 1011 may not be displayed. In this case, the UI 1003 may be omitted, and the UI 1005 may be displayed based on receiving a user's input for converting a camera in the UI 1001.

Figure 11:
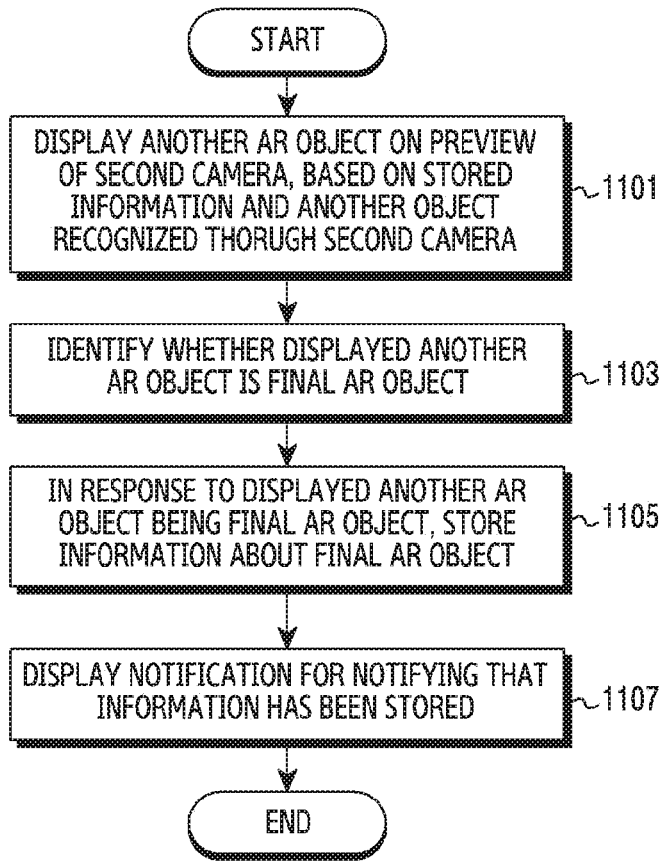
FIG. 11 illustrates an example of an operation of an electronic device for displaying a final AR object according to various embodiments of the disclosure.

FIG. 11 illustrates an example of an operation of an electronic device for displaying a final AR object according to various embodiments of the disclosure.

According to various embodiments, operation 1101 may correspond to operation 513 of FIG. 5 or operation 613 of FIG. 6. A duplicated description may be omitted in relation with operation 1101 and in relation with this, may refer to FIG. 5 or FIG. 6. Operation 1103 to operation 1107 may be performed in sequence after operation 513 or operation 613 is performed.

In operation 1101, the processor 120 may display the another AR object on the preview of the second camera 402, based on the stored information and the another object recognized through the second camera 402. Operation 1101 may be the same or be similar with operation 513 of FIG. 5 or operation 613 of FIG. 6.

In operation 1103, the processor 120 may identify whether the displayed another AR object is a final AR object. In response to there not being a further AR object that is displayable in relation with the stored information in the server of the application or the memory 130, the another AR object may be identified as the final AR object.

In operation 1105, in response to the displayed another AR object being the final AR object, the processor 120 may store information about the final AR object. In response to the further AR object displayable having not been stored, the processor 120 may identify, as the final AR object, the another AR object displayed through operation 1101. Information about the another AR object identified as the final AR object may be stored in the memory 130 or the server of the application.

In operation 1107, the processor 120 may display a notification for notifying that the information about the final AR object has been stored. The notification may be displayed in various forms. For example, the processor 120 may show that the information about the final AR object has been stored through an operation of flickering the final AR object. For another example, the processor 120 may show that the information about the final AR object has been stored by displaying a previously given notification.

Figure 12:
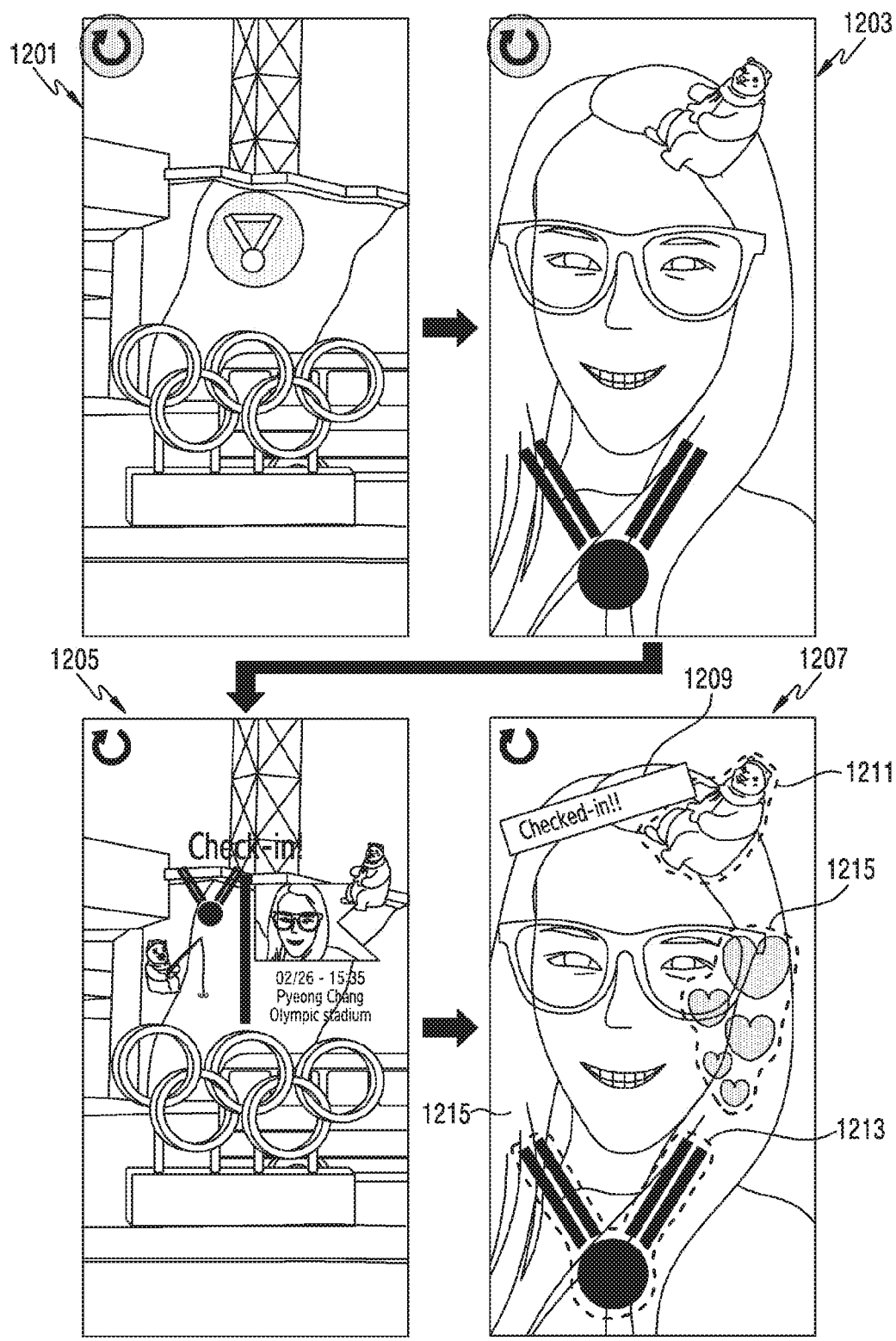
FIG. 12 illustrates an example of a UI for displaying a final AR object according to various embodiments of the disclosure.

FIG. 12 illustrates an example of a UI for displaying a final AR object according to various embodiments of the disclosure.

In various embodiments, a UI 1201 may correspond to the UI 701 of FIG. 7, and a UI 1203 may correspond to the UI 703 of FIG. 7, and a UI 1205 may correspond to the UI 705 of FIG. 7. A duplicated operation or construction with FIG. 7 may be omitted, and in relation with this, may refer to FIG. 7.

A UI 1207 may be a UI which is displayed based on obtaining a user's input to an icon for converting a camera displayed in the UI 1205.

Referring to FIG. 12, the UI 1207 may display an AR object, based on the AR object included in the UI 1205 and an object included in a preview of the UI 1207. The AR object may be displayed in combination of a plurality of images 1209, 1211, 1213 and 1215. The plurality of images may be the AR object that is configured as one set.

In various embodiments, the AR object displayed in the UI 1207 may be the final AR object. In response to there not being information related with the AR object displayed in the UI 1207 in the memory 130 or the server of the application, the processor 120 may identify that the AR object displayed in the UI 1207 is the final AR object. Though not illustrated, in response to identifying that the AR object displayed in the UI 1207 is the final AR object, the processor 120 may display a notification. For example, the processor 120 may perform an operation of flickering some of the plurality of images. For another example, to display being the final AR object, the processor 120 may repeat an operation of changing at least one of a color of the plurality of images, a brightness, a size, or a location.

Figure 13:
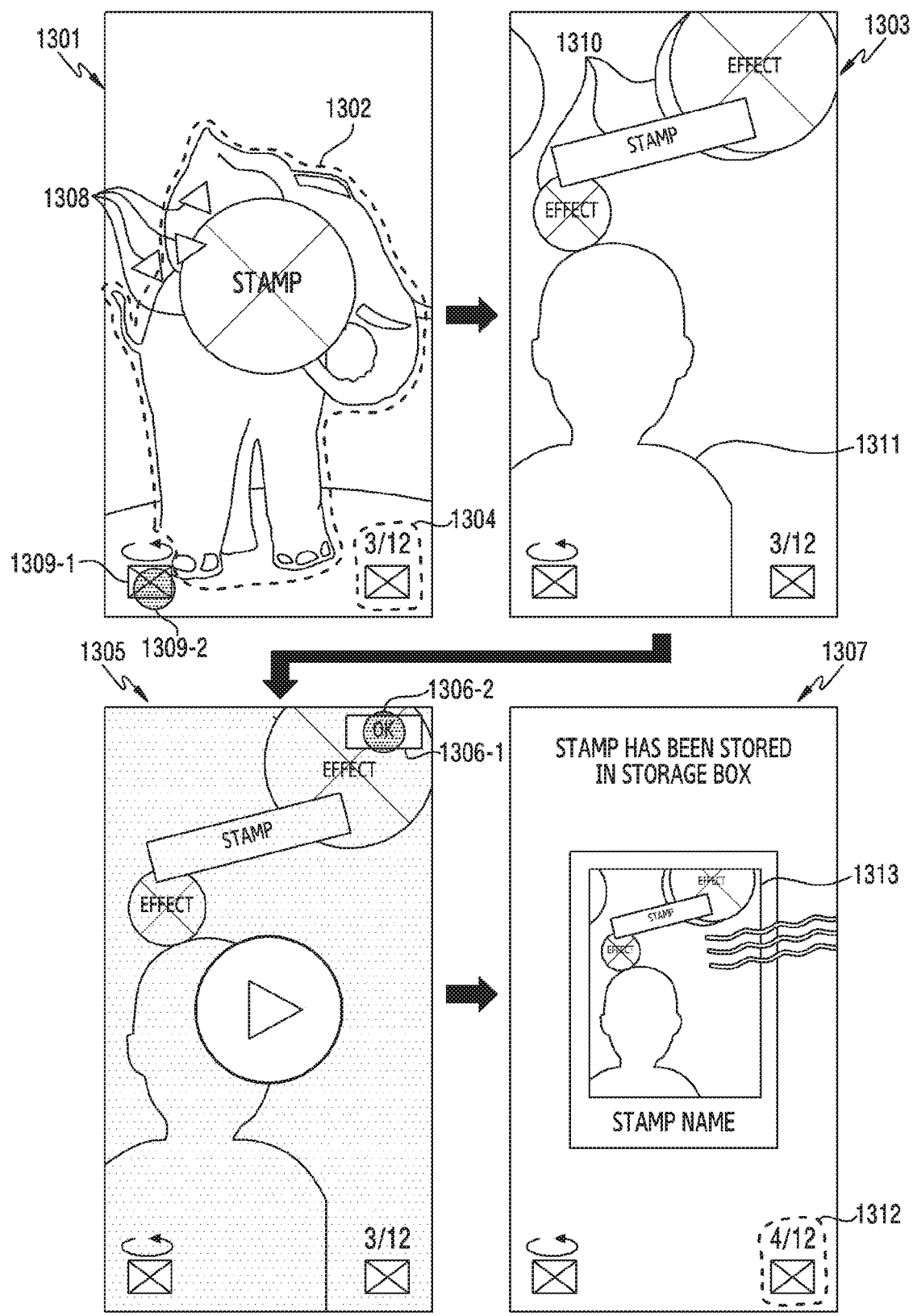
FIG. 13 illustrates another example of a UI for displaying a final AR object according to various embodiments of the disclosure.

FIG. 13 illustrates another example of a UI for displaying a final AR object according to various embodiments of the disclosure.

In various embodiments, the processor 120 may display a preview by executing an application. In a state in which the preview is executed, the electronic device 101 is moved, whereby an image acquired through a camera may be changed. In this case, the processor 120 may identify the changed image, to refine the preview continuously. In response to a previously given object 1302 being included within the refined preview, the processor 120 may identify the object 1302, and display an AR object 1308 related with this.

Referring to FIG. 13, the AR object 1308 may consist of a plurality of images. The plurality of images may be distinguished into a focused image (e.g., a stamp) and images (e.g., effects) showing an effect for emphasizing the focused image near the focused image. For example, the AR object 1308 may include images showing effects of triangle forms and a central stamp.

In various embodiments, in response to a record related with the stamp having been stored in the electronic device 101, the electronic device 101 may display the number of the stored records. An icon 1304 displayed within a UI 1301 may display the record which is stored in relation with the stamp. In response to the number of images related with the stamp stored in the server of the application being 12, and the number of the stored stamp records being 3, the icon 1304 may be displayed, together with a text '3/12'. The text displayed together with the icon 1304 may be maintained continuously until before the stamp record is changed.

In various embodiments, an icon for converting a camera may be displayed in the form of an icon 1309-1. In response to an input 1309-2 to the icon 1309-1 being obtained, the processor 120 may store information about the AR object 1308. The processor 120 may change the camera for displaying the preview, based on that the information about the AR object 1308 is stored. The processor 120 may display a UI 1303, based on an image acquired through the changed camera. The processor 120 may identify a recognizable object 1311 included within the image acquired through the changed camera. The processor 120 may display an AR object 1310 within the UI 1303, based on the identified object 1311 and the stored information.

In various embodiments, in response to an input 1309-2 for converting the camera being obtained, the processor 120 may continuously acquire an image through the changed camera. The processor 120 may continuously identify an object included in the acquired image, and may identify the related AR object 1310, based on the identifying. For example, according as the camera for displaying the preview is changed, the processor 120 may acquire a video (or a moving image) for displaying another AR object 1310 which is related with the stored information and the object. Here, the UI 1303 may be a part of the acquired video. A UI 1305 indicates a UI of timing at which the acquisition of the video is completed. According as the video acquisition is completed, the processor 120 may display an icon 1306-1 for storing the acquired video within a UI 1305. In response to obtaining a user's input 1306-2 to the displayed icon, the processor 120 may store the acquired video. The processor 120 may display a UI 1307, based on that the video is stored. The UI 1307 may include an image 1313 corresponding to a preview of the stored video. In response to the acquired video being stored, the UI 1307 may refine a text of an icon 1311 displaying a stamp record (or stored stamp). For example, the icon 1304 displayed before the stamp record is stored may be refined into the icon 1312.

Figure 14:
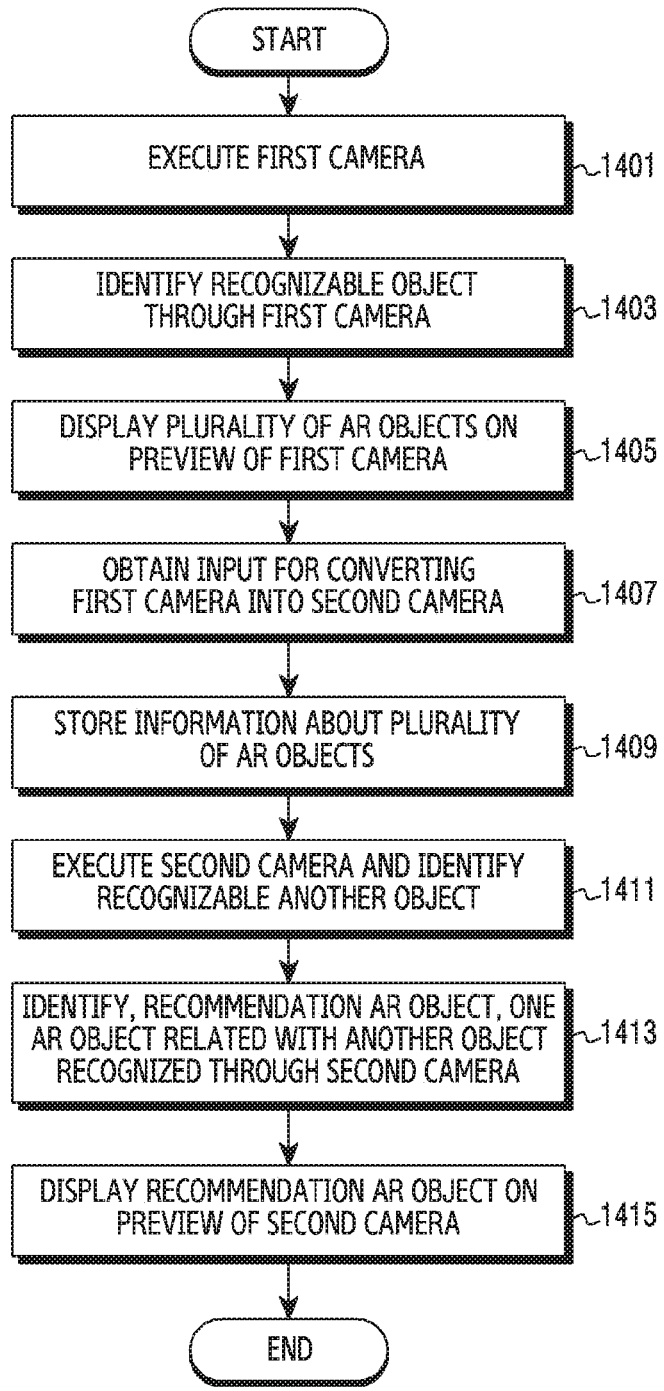
FIG. 14 illustrates an example of an operation of an electronic device for displaying a recommendation AR object according to various embodiments of the disclosure.

FIG. 14 illustrates an example of an operation of the electronic device 101 for displaying a recommendation AR object according to various embodiments of the disclosure.

In operation 1401, the processor 120 may execute the first camera 401. The processor 120 may execute the first camera 401 according as the application is executed.

In operation 1403, the processor 120 may identify a recognizable object through the first camera 401. The processor 120 may identify an image acquired by the first camera 401, thereby identifying a recognizable object included within the acquired image.

In operation 1405, the processor 120 may display a plurality of AR objects on a preview of the first camera 401. The processor 120 may identify the plurality of AR objects related with the identified object, based on the identified object. The plurality of AR objects related with the object may be previously given and be stored in the memory 130 or a server of the application.

In operation 1407, the processor 120 may obtain an input for converting the first camera 401 into the second camera 402. The processor 120 may change a camera for displaying a preview from the first camera 401 to the second camera 402.

In operation 1409, the processor 120 may store information about the plurality of AR objects. In response to obtaining the input for converting the camera, the processor 120 may store information about the plurality of AR objects related with the object.

In operation 1411, the processor 120 may execute the second camera 402, and identify a recognizable another object. The processor 120 may execute the second camera 402, and may acquire an image through the second camera 402. The acquired image may include a plurality of objects, and the processor 120 may identify the recognizable another object among the included plurality of objects.

In operation 1413, the processor 120 may identify, as a recommendation AR object, one AR object related with the identified another object among the plurality of AR objects. The processor 120 may identify another object, thereby acquiring related information from the memory 130 or the server of the application. The processor 120 may identify one AR object having the highest relationship with the identified another object among the plurality of AR objects, based on the acquired information. For example, in response to the identified another object being a user of the electronic device 101, the processor 120 may acquire information about a user's preference from the memory 130. The processor 120 may identify, as a recommendation AR object, an AR object closest to the user's preference among the plurality of AR objects.

In operation 1415, the processor 120 may display the recommendation AR object on a preview of the second camera. In some embodiments, in response to the preview of the second camera being displayed, the processor 120 may display the recommendation AR object. In other some embodiments, the processor 120 may display another AR object for representing the recommendation AR object. In response to a user's input to the another AR object being obtained, the processor 120 may display the recommendation AR object. In further other some embodiments, the processor 120 may preferentially display a part of the recommendation AR object. In response to a user's input to the part of the recommendation AR object being obtained, the recommendation AR object may be all displayed.

Figure 15:
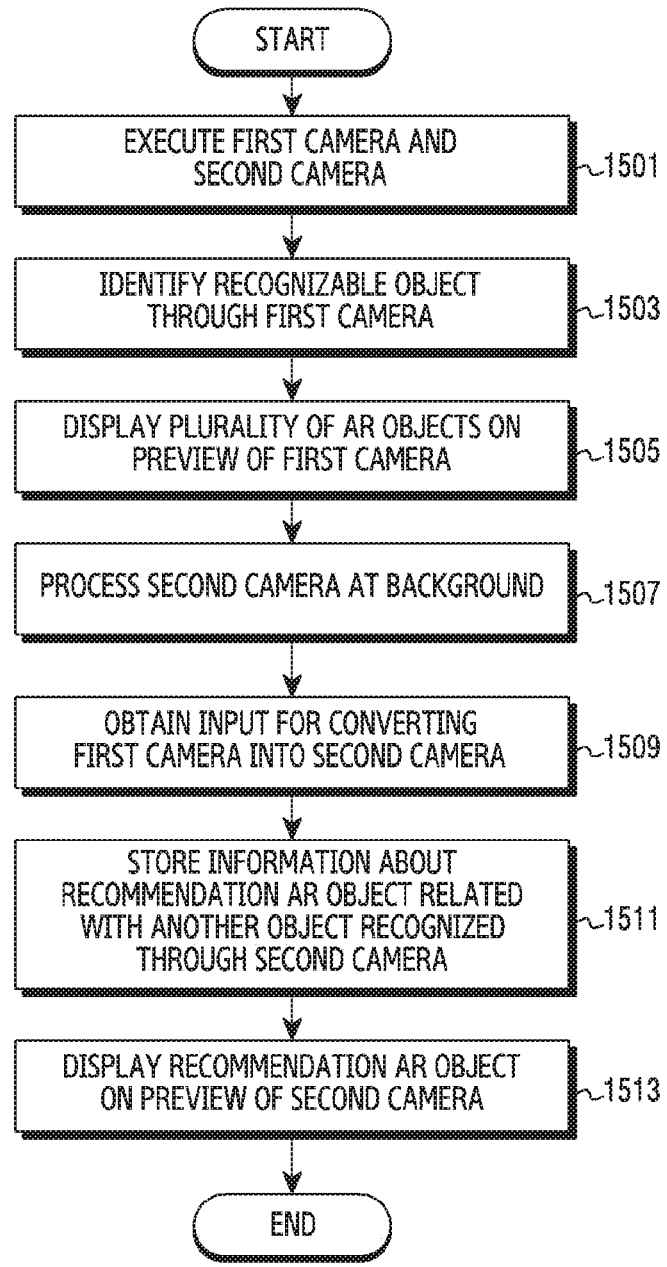
FIG. 15 illustrates another example of an operation of an electronic device for displaying a recommendation AR object according to various embodiments of the disclosure.

FIG. 15 illustrates another example of an operation of the electronic device 101 for displaying a recommendation AR object according to various embodiments of the disclosure.

In operation 1501, the processor 120 may execute the first camera 401 and the second camera 402. According as an application is executed, the processor 120 may execute the first camera 401 and the second camera 402.

In operation 1503, the processor 120 may identify a recognizable object through the first camera 401. The processor 120 may identify an image acquired by the first camera 401, thereby identifying the recognizable object included within the acquired image.

In operation 1505, the processor 120 may display a plurality of AR objects on a preview of the first camera 401. The processor 120 may identify the plurality of AR objects related with the identified object, based on the identified object. The plurality of AR objects related with the object may be previously given and be stored in the memory 130 or a server of the application.

In operation 1507, the processor 120 may process the second camera 402 at a background. While the preview of the first camera 401 is displayed, the processor 120 may identify an image through the second camera 402 at the background. A recognizable another object may be included within the image acquired through the second camera 402. The processor 120 may identify the image acquired through the second camera 402, thereby identifying the recognizable another object.

In various embodiments, in response to operation 1501 being performed, operation 1507 may be continuously performed.

In operation 1509, the processor 120 may obtain an input for converting the first camera 401 into the second camera 402. The processor 120 may change a camera for displaying a preview from the first camera 401 to the second camera 402.

In operation 1511, the processor 120 may store information about a recommendation AR object among the plurality of AR objects. The processor 120 may identify the recommendation AR object related with the another object among the plurality of AR objects, based on that operation 1507 is continuously maintained. The processor 120 may identify, as the recommendation AR object, one AR object having the highest relationship with the another object recognized through the second camera 402 among the plurality of AR objects.

In operation 1513, the processor 120 may display the recommendation AR object on a preview of the second camera 402. The processor 120 may display the recommendation AR object identified in operation 1511, together with the preview acquired through the second camera 402.

Figure 16:
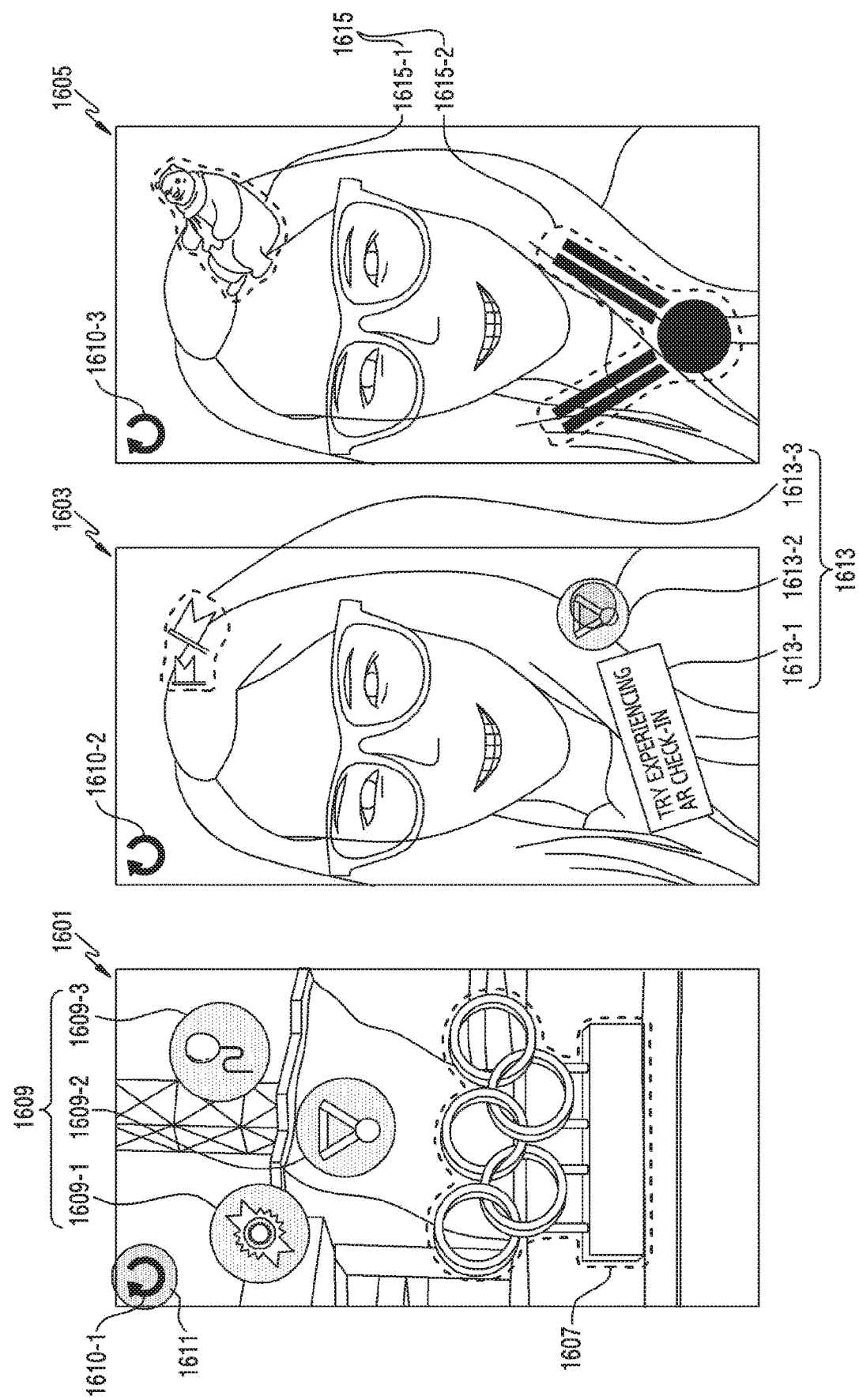
FIG. 16 illustrates an example of a UI for displaying a recommendation AR object according to various embodiments of the disclosure.

FIG. 16 illustrates an example of an operation of a UI for displaying a recommendation AR object according to various embodiments of the disclosure.

A UI 1601 may include a plurality of AR objects 1609 related with an object 1607. In some embodiments, the plurality of AR objects may include an AR object 1609-1 related with a certificate of award, an AR object 1609-2 related with a balloon, and an AR object 1609-3 related with Olympic. In various embodiments, in response to another object being a face of a user of the electronic device 101, the electronic device 101 may link with a server of a social network service (SNS) account of the user, thereby obtaining a user's interest. In response to the obtained interest is Olympic, the electronic device 101 may identify the AR object related with Olympic as a recommendation AR object. In other some embodiments, information about an AR object related with an application may be refined continuously through a server of the application. The processor 120 may receive information related with preferences or popularities of various users for the plurality of AR objects from the server of the application. The processor 120 may identify the recommendation AR object, based on the received information. For example, the processor 120 may identify the AR object 1609-3 having the highest preference among the plurality of AR objects 1609, as an AR object for displaying the recommendation AR object.

In various embodiments, the plurality of AR objects 1609 included in the UI 1601 may be AR objects which are displayed in the form of an icon in order to indicate the recommendation AR object, respectively. For example, to indicate that the recommendation AR object is the AR object related with Olympic, the AR object 1609-3 of an Olympic icon shape may be displayed.

In various embodiments, according as a user's input 1611 to an icon 1610-1 included in the UI 1601 being obtained, the processor 120 may display a UI 1603. The icon 1610-1 may be an icon which is set to receive an input for converting a camera, and icons 1610-1 to 1610-3 may be the same icon. The processor 120 may convert a camera for displaying a preview, based on the user's input to the icon 1610-1.

The UI 1603 may include a recommendation AR object. In some embodiments, according as the user's input 1611 for converting the camera being obtained in the UI 1301, the processor 120 may display the UI 1603 including the recommendation AR object. The UI 1603 may include another AR object 1613 for indicating the recommendation AR object. The another AR object 1613 may include an AR object 1613-1 of a text box form, an AR object 1613-3 of a flag shape, and an AR object 1613-2 configured to receive an input. In response to a user's input to the AR object 1613-2 being obtained, a UI 1605 may be displayed. The UI 1605 may display a recommendation AR object 1615 which is related with an object recognized through the camera and the user's input. Thought not illustrated, the another AR object 1613 may consist of a part of the recommendation AR object. In response to a user's input to the part of the recommendation AR object 1615 being obtained, the recommendation AR object 1615 may be all displayed. The recommendation AR object 1615 may be displayed in various schemes. For example, the recommendation AR object 1615 may include an Olympic medal image 1615-2 and an Olympic character image 1615-1.

Figure 17:
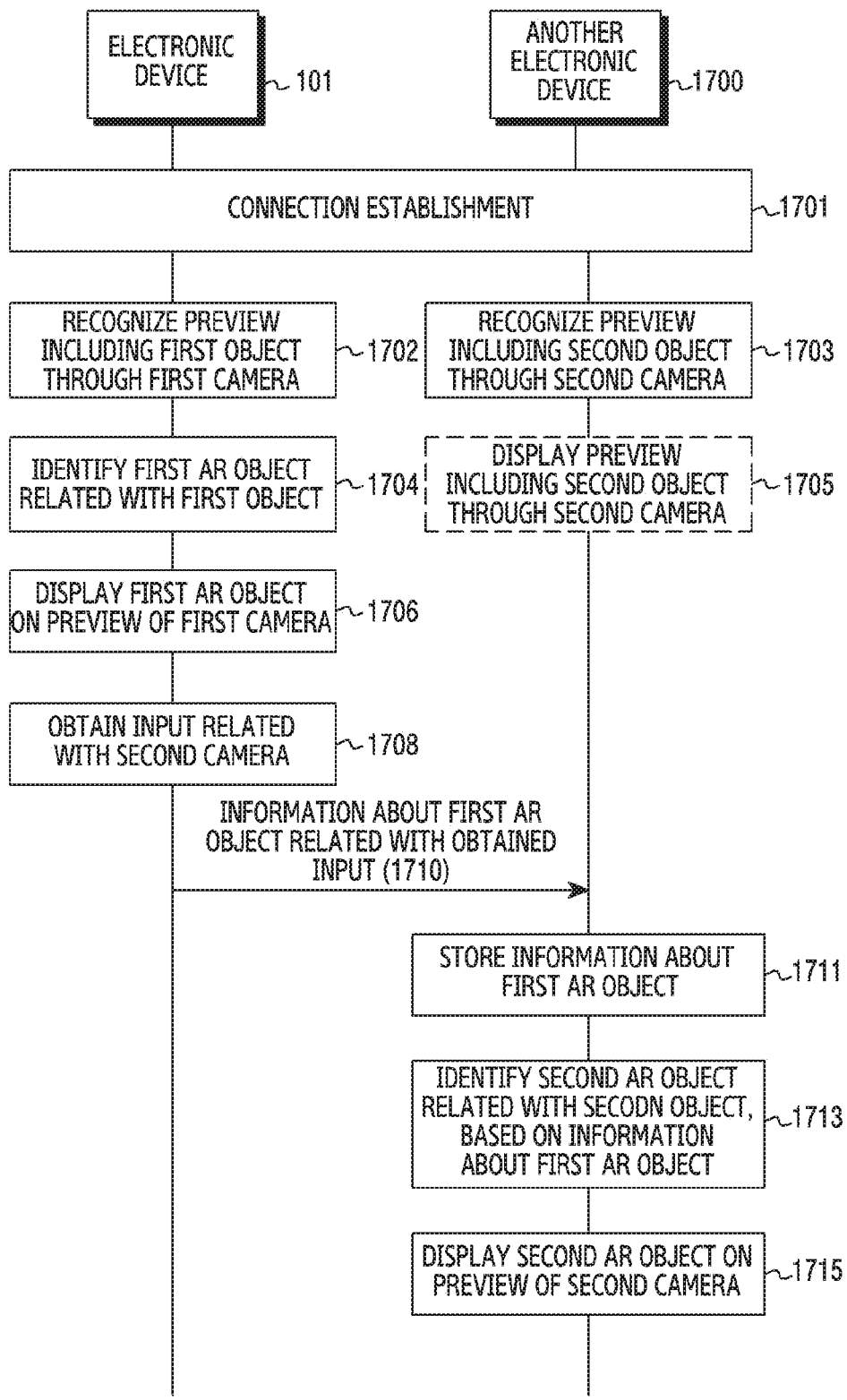
FIG. 17 illustrates an example of a signal flow of an electronic device for displaying an AR object related with another electronic device according to various embodiments of the disclosure.

FIG. 17 illustrates an example of a signal flow of an electronic device for displaying an AR object related with another electronic device according to various embodiments of the disclosure.

In operation 1701, the electronic device 101 may be connected with the another electronic device 1700. The electronic device 101 may be connected with the another electronic device 1700, based on that an application is executed. Because an operation (e.g., pairing) of connecting the electronic device 101 and the another electronic device 1700 with each other corresponds to the technology of the related art, a detailed description related with this may be omitted. The electronic device 101 may be connected with the another electronic device 1700, thereby transmitting and/or receiving various information with the another electronic device 1700. For example, the electronic device 101 and the another electronic device 1700 may transmit and/or receive information about an image acquired through a camera included each of them.

In operation 1702, the electronic device 101 may recognize a preview including a first object through the first camera. The electronic device 101 may identify the first object included within the image acquired through the first camera.

In operation 1704, the electronic device 101 may identify a first AR object related with the first object. The electronic device 101 may identify the first AR object related with the identified first object. Information about the first AR object may have been stored in the server of the application or the memory 130.

In operation 1706, the electronic device 101 may display the first AR object on the preview of the first camera. For example, the electronic device 101 may display the first AR object such that the first AR object is located around the first object included in the preview of the first camera.

In operation 1708, the electronic device 101 may obtain an input related with the second camera. The electronic device 101 may obtain a user's input related with the first AR object included in the displayed preview. In various embodiments, the electronic device 101 may receive a user's input related with the displayed preview. In some embodiments, the electronic device 101 may receive a user's input for storing information about the first AR object included in the displayed preview. In some embodiments, the electronic device 101 may receive a user's input for transmitting the information about the first object included in the displayed preview to another electronic device. The user's input may be, for example, an input to at least one icon displayed on the preview. For another example, the user's input may be a voice signal which is recognized based on a voice recognition function.

In operation 1703, the another electronic device 1700 may recognize a preview including a second object through the second camera. The second camera may be a camera included in the another electronic device. The electronic device 101 may receive an image acquired through the second camera of the another electronic device 1700 from the another electronic device 1700, and identify the second object included within the received image. In various embodiments, the second camera may be a camera that is directly or indirectly connected with the electronic device 101. In some embodiments, the electronic device 101 may identify information about the image acquired from the second camera through the processor 120, based on a connection with the another electronic device 1700. Operation 1703 may be performed at the same time of performing operation 1702 to operation 1706.

In operation 1705, the another electronic device 1700 may display the preview including the second object through the second camera. In various embodiments, operation 1705 may be omitted, and information about the preview of the second camera may be transmitted to the electronic device 101 and be identified through the processor 120.

In operation 1710, the electronic device 101 may transmit information about the first AR object which is related with the input obtained through operation 1708, to the another electronic device 1700. According as obtaining the user's input related with the second camera, the electronic device 101 may store the information about the first AR object in the another electronic device 1700.

In operation 1711, the another electronic device 1700 may store the information about the first AR object, based on receiving the information about the first AR object. The another electronic device 1700 may store the information about the first AR object, based on receiving a signal on the input of the electronic device 101 related with the second camera. For example, while a video call connection with the electronic device 101 is maintained, the another electronic device 1700 may receive a voice signal of the first AR object from the electronic device 101. According as the voice signal is received, the another electronic device 1700 may store the information about the first AR object.

Thought not illustrated, in various embodiments, the electronic device 101 and the another electronic device 1700 may share (or transmit and/or receive, or synchronize) information about each preview at a given interval of time, based on operation 1701. In this case, according as operation 1710 is performed, the another electronic device 1700 may identify the first AR object for which the user's input is obtained among the shared information. The another electronic device 1700 may store the information about the first AR object, based on the identifying of the first AR object.

In operation 1713, the another electronic device 1700 may identify a second AR object related with the second object, based on the information about the first AR object. The another electronic device 1700 may identify the second AR object included within the image acquired through the second camera. The another electronic device 1700 may identify the second AR object, based on the identified second object and the stored information about the first AR object.

In operation 1715, the another electronic device 1700 may display the second AR object on the preview of the second camera. The another electronic device 1700 may display the second AR object identified through operation 1713, on the preview of the second camera.

In various embodiments, the another electronic device 1700 and the electronic device 101 may operate reversely. For example, the electronic device 101 may perform an operation of the another electronic device 1700 of FIG. 17, and the another electronic device 1700 may perform an operation of the electronic device 101.

Figure 18:
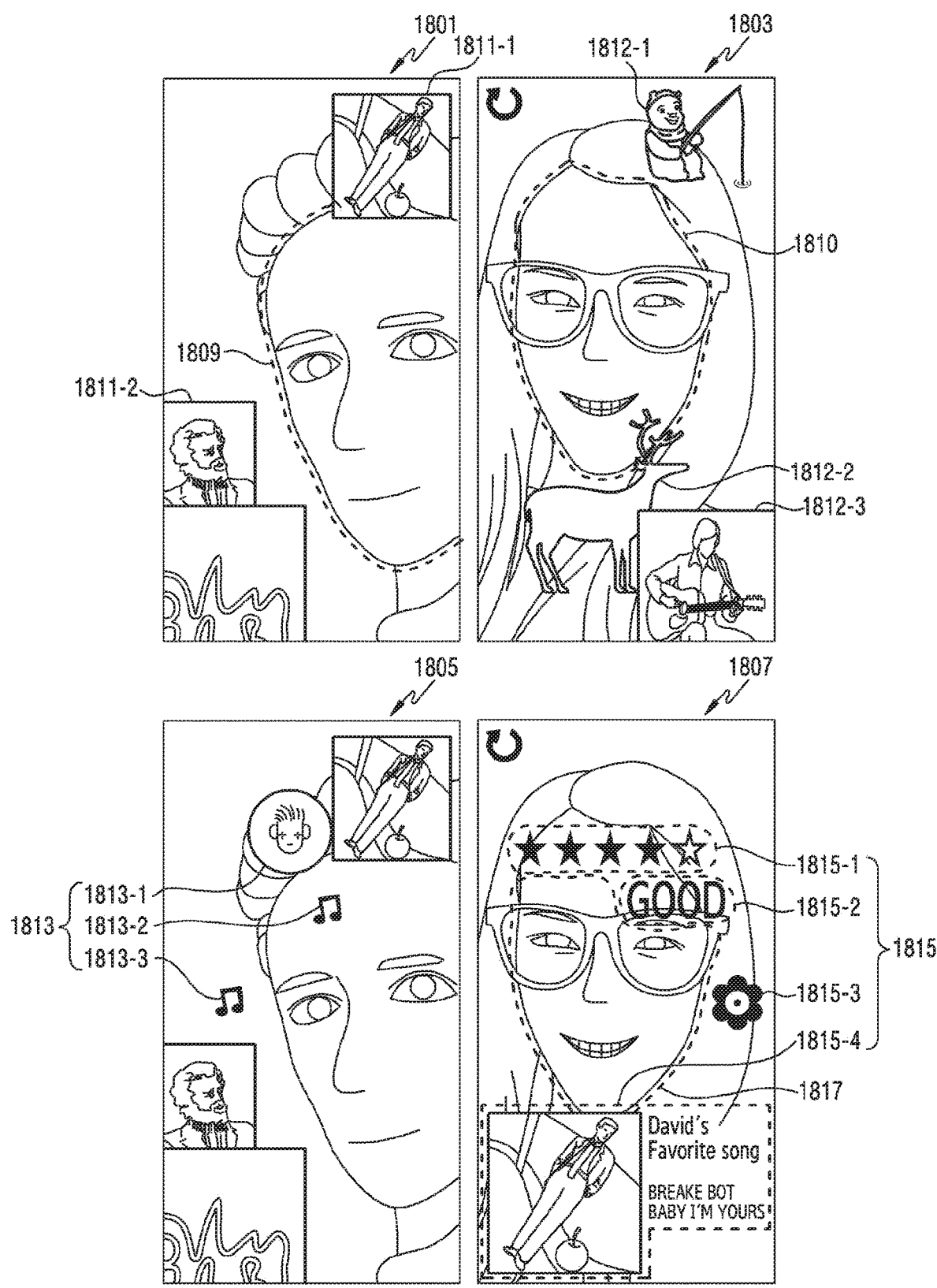
FIG. 18 illustrates an example of a UI of an electronic device for displaying an AR object related with another electronic device according to various embodiments of the disclosure.

FIG. 18 illustrates an example of a UI of an electronic device for displaying an AR object related with another electronic device according to various embodiments of the disclosure.

In various embodiments, the electronic device 101 may be wiredly or wirelessly connected with another electronic device. A UI 1801 may be displayed in the electronic device 101, based on the connection, and a UI 1803 may be displayed in the another electronic device connected with the electronic device 101.

The UI 1801 may include a preview acquired through a front camera included in the electronic device 101. The electronic device 101 may identify an object 1809 included in the UI 1801, and may display at least one first AR object 1811-1 or 1811-2, based on the identifying. The electronic device 101 may identify and display an AR object corresponding to interest information. For example, by identifying that the object 1809 is a user of the electronic device 101, the electronic device 101 may acquire the interest information stored in a SNS account of the user. The interest information may be information which is read most recently by the user or is marked to be of interest (e.g., whose given icon is clicked). For another example, by identifying that the object 1809 is the user of the electronic device 101, the electronic device 101 may acquire information stored in a cloud service of the user. The electronic device 101 may identify at least one of the acquired information, as user's interest information. For further example, the interest information may be identified based on a search history stored in the electronic device 101, screen shot (or stored image) information, etc.

The UI 1803 may include a preview acquired through a front camera included in the another electronic device. The another electronic device may identify an object 1810 included in the UI 1803, and may display at least one second AR object 1812-1, 1812-2 or 1812-3, based on the identifying of the object 1810.

In various embodiments, at least one first AR object 1811-1 or 1811-2 may be displayed in various forms, without being limited to the disclosure in relation with the object 1809. The form in which the at least one second AR object 1812-1, 1812-2 or 1812-3 is displayed is not limited to the disclosure.

In various embodiments, the electronic device 101 may receive a given input to the UI 1801. The given input may be an input for sharing, by the electronic device 101, information with the another electronic device. In response to receiving the given input, the electronic device 101 may share the information with the another electronic device.

In various embodiments, the another electronic device may display a UI 1807, based on the shared information. The UI 1807 may be a UI which is displayed through the another electronic device in response to the given input being received from the electronic device 101. The UI 1807 may include an AR object 1815 related with the object 1817 or an AR object 1817 related with the shared information. For example, AR objects 1815-1, 1815-2, 1815-3 and 1815-4 may associated with the object 1817.

In various embodiments, the electronic device 101 may display a UI 1805, based on the shared information. The UI 1805 may identify an object recognized through the electronic device 101, and display a refined AR object 1813. For example, in response to an object included in the preview acquired through the electronic device 101 being a male, in response to the object being identified, the electronic device 101 may display an AR object 1813-1 showing being the male. For another example, in response to the object included in the preview acquired through the electronic device 101 being the male, in response to the object being identified, the electronic device 101 may display the AR object 1813-1 showing being the male. For further example, in response to the received input being an input for sharing information about a song, the electronic device 101 may display an AR object 1813-2 or 1813-3 for indicating the information about the song.

Figure 19:
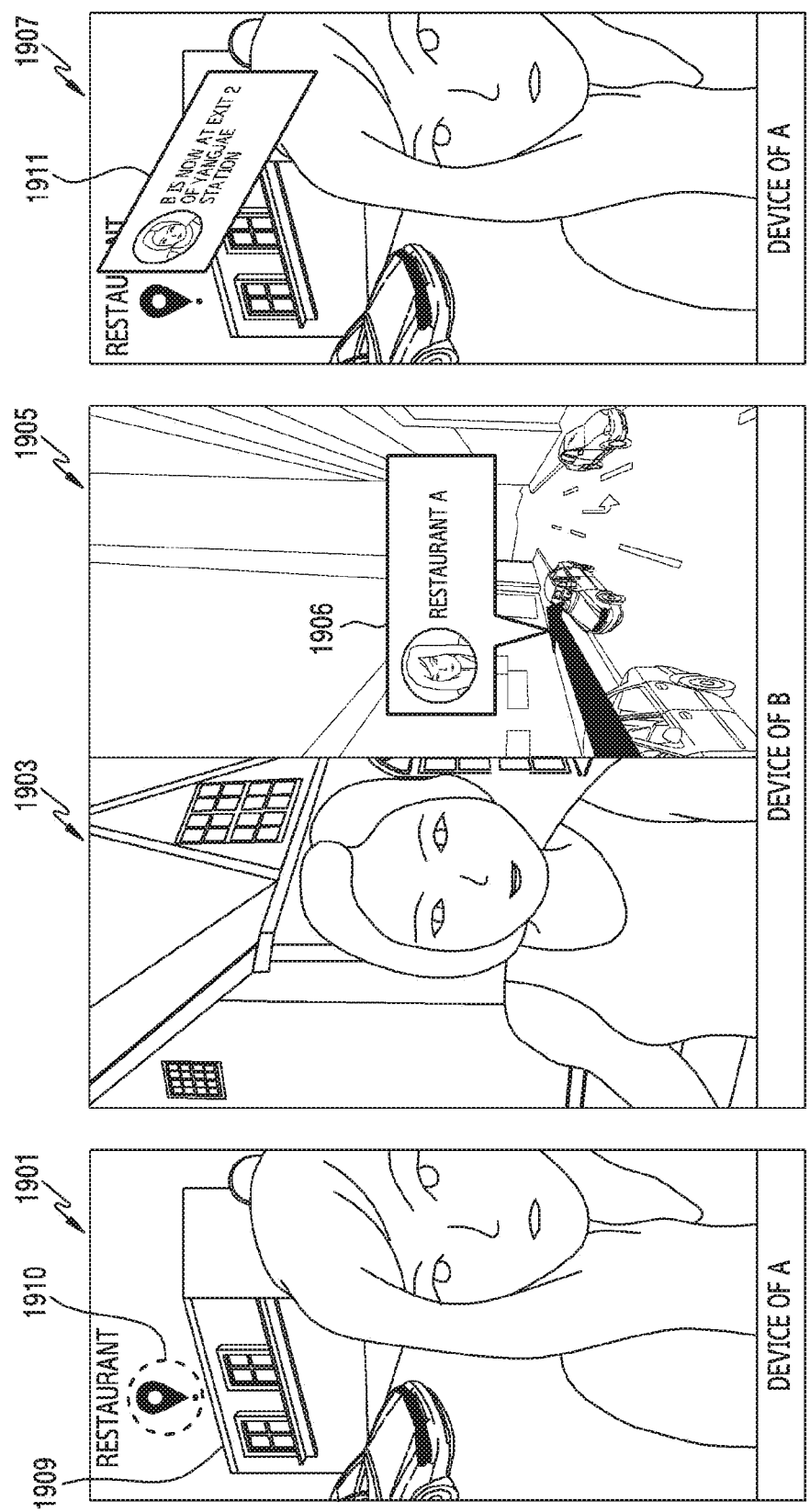
FIG. 19 illustrates another example of a UI of an electronic device for displaying an AR object related with another electronic device according to various embodiments of the disclosure.

FIG. 19 illustrates another example of a UI of an electronic device for displaying an AR object related with another electronic device according to various embodiments of the disclosure.

In various embodiments, FIG. 19 illustrates an example of a UI which is displayed according as the electronic device 101 (e.g., a device of A) and another electronic device (e.g., a device of B) are connected with each other. The electronic device 101 and the another electronic device may be devices capable of performing the same function or operation.

In various embodiments, the electronic device 101 and the another electronic device may be wiredly or wirelessly connected with each other. For example, according as a video call is executed, the electronic device 101 and the another electronic device may be wirelessly connected with each other. In response to the connection being established, the electronic device 101 may display a UI 1901, and the another electronic device may display a UI 1903.

The UI 1901 may include a recognizable object 1909 of the electronic device 101 and an AR object 1910 related with the object. The electronic device 101 may previously select the object 1909, based on information stored by a user of the electronic device 101. The stored information may be, for example, information about an appointment place which is stored by the user of the electronic device 101.

In various embodiments, the another electronic device may display the UI 1903, based on a connection with the electronic device 101. The another electronic device may change the UI 1903 into a UI 1905, based on receiving a given input. For example, the another electronic device may display the UI 1905 related with the electronic device 101, based on obtaining a given voice signal such as 'where are you?'. In response to receiving the given input, the another electronic device may store information about the AR object 1910.

The UI 1905 may include a preview acquired through a rear camera of the another electronic device. The another electronic device may display an AR object 1906, based on the information about the AR object 1910 and an object identified through the another electronic device. The AR object 1906 may be information related with the AR object 1910 displayed through the electronic device 101. For example, the AR object 1910 and the AR object 1906 may be mutually different AR objects for displaying the same place. The object identified through the another electronic device may be at least one thing included in the preview. For example, the identified object may be a signpost indicating a location included in the preview. The another electronic device may identify a location of the another electronic device by identifying the signpost, and may display the AR object 1906, based on the identified location and the AR object 1910.

The electronic device 101 may receive information about the AR object 1906 included in the UI 1905, based on the connection with the another electronic device. The electronic device 101 may display a UI 1907, based on the received information. The UI 1907 may include an AR object 1911 showing a location of a user of the another electronic device. The AR object 1911 showing the location of the user may include, for example, the text 'B is now at exit 2 of Yangjae station'.

According to an electronic device and an operation method thereof according to various embodiments, the electronic device may provide, together, an AR object associated with an image acquired through a first camera and another AR object associated with an image acquired through a second camera, thereby providing an extended experience to a user.

According to various embodiments, the electronic device may store information about an AR object related with an object acquired through the first camera.

According to various embodiments, the electronic device may display the AR object of the acquired object, based on the stored information about the AR object, thereby providing a wide experience to the user.

An effect that may be obtained from the disclosure is not limited to the effects mentioned above, and other effects not mentioned would be able to be apparently understood from the following statement by a person having ordinary skill in the art to which the disclosure pertains.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a memory comprising instructions stored thereon; and
at least one processor coupled with the memory and the display,
wherein the at least one processor is configured to execute the stored instructions so as to:
identify a first object on a preview acquired from a first camera,
display a first augmented reality (AR) object related with the first object on the preview,
in response to obtaining an input for converting from the first camera to a second camera, store information about the first AR object, and
display a second AR object which is related with a second object comprised in a preview of the second camera and the information about the first AR object, on the preview of the second camera.

2. The electronic device of claim 1, wherein the at least one processor is further configured to execute the stored instructions so as to:
in response to obtaining an input of converting from the second camera to the first camera, store information about the second AR object; and
display a third AR object which is related with a third object comprised in the preview of the first camera and the stored information about the second AR object on the preview of the first camera, based on the stored information about the second AR object.

3. The electronic device of claim 2, wherein the third object corresponds to the first object.

4. The electronic device of claim 1, wherein the at least one processor is further configured to execute the stored instructions so as to display a plurality of AR objects on a preview image of the first camera, based on comprising the plurality of AR objects related with the first object.

5. The electronic device of claim 4, wherein the at least one processor is further configured to execute the stored instruction so as to, in response to identifying an input for selecting one of the plurality of AR objects, identify the selected AR object as the first AR object.

6. The electronic device of claim 4, wherein the at least one processor is further configured to execute the stored instructions so as to:
in response to obtaining the input for converting from the first camera to the second camera, identify an AR object related with a user of the electronic device among the plurality of AR objects;
store information about the identified AR object; and
display the identified AR object on the preview of the second camera.

7. The electronic device of claim 4, wherein the at least one processor is further configured to execute the stored instructions so as to:
in response to obtaining the input of converting from the first camera to the second camera, identify an AR object related with a user of the electronic device among the plurality of AR objects;
store information about the identified AR object, and display a third AR object for indicating the identified AR object on the preview of the second camera; and
in response to obtaining an input to the third AR object, display the identified AR object on the preview of the second camera.

8. The electronic device of claim 1, wherein the at least one processor is further configured to execute the stored instructions so as to:
in response to obtaining a user's input for execution of an application related with the first AR object and the second AR object, execute the first camera and the second camera;
while the preview of the second camera is displayed, refine the first AR object through the first camera;
store information about the refined first AR object; and
refine the second AR object, based on the stored information.

9. The electronic device of claim 1, wherein the at least one processor is further configured to execute the stored instructions so as to:
identify whether a plurality of cameras comprised in the electronic device have been formerly used;
in response to at least one camera among the plurality of cameras has been formerly used, identify, as the first camera, the most recently used camera among the plurality of cameras; and
in response to the at least one camera among the plurality of cameras has not been formerly used, identify, as the first camera, a camera disposed in a rear surface of the electronic device.

10. The electronic device of claim 1,
wherein the first camera comprises a camera comprised in another electronic device, based on that the electronic device is wiredly or wirelessly connected with the other electronic device, and
wherein the first AR object is related with an object identified through the camera comprised in the other electronic device.

11. A method for an electronic device, comprising:
identifying a first object on a preview acquired from a first camera;
displaying a first augmented reality (AR) object related with the first object on the preview;
in response to obtaining an input for converting from the first camera to a second camera, storing information about the first AR object; and
displaying a second AR object which is related with a second object comprised in a preview of the second camera and the information about the first AR object, on the preview of the second camera.

12. The method of claim 11, further comprising:
in response to obtaining an input of converting from the second camera to the first camera, storing information about the second AR object; and
displaying a third AR object which is related with a third object comprised in the preview of the first camera and the stored information about the second AR object on the preview of the first camera, based on the stored information about the second AR object.

13. The method of claim 12, wherein the third object corresponds to the first object.

14. The method of claim 11, further comprising displaying a plurality of AR objects on a preview image of the first camera, based on comprising the plurality of AR objects related with the first object.

15. The method of claim 14, further comprising, in response to identifying an input for selecting one of the plurality of AR objects, identifying the selected AR object as the first AR object.

16. The method of claim 14, further comprising:
in response to obtaining the input for converting from the first camera to the second camera, identifying an AR object related with a user of the electronic device among the plurality of AR objects;
storing information about the identified AR object; and
displaying the identified AR object on the preview of the second camera.

17. The method of claim 14, further comprising:
in response to obtaining the input of converting from the first camera to the second camera, identifying an AR object related with a user of the electronic device among the plurality of AR objects;
storing information about the identified AR object;
displaying a third AR object for indicating the identified AR object on the preview of the second camera; and
in response to obtaining an input to the third AR object, displaying the identified AR object on the preview of the second camera.

18. The method of claim 11, further comprising:
in response to obtaining a user's input for execution of an application related with the first AR object and the second AR object, executing the first camera and the second camera;
while the preview of the second camera is displayed, refining the first AR object through the first camera;
storing information about the refined first AR object; and
refining the second AR object, based on the stored information.

19. The method of claim 11, further comprising:
identifying whether a plurality of cameras comprised in the electronic device have been formerly used;
in response to at least one camera among the plurality of cameras has been formerly used, identifying, as the first camera, the most recently used camera among the plurality of cameras; and in response to the at least one camera among the plurality of cameras has not been formerly used, identifying, as the first camera, a camera disposed in a rear surface of the electronic device.

20. The method of claim 11, wherein the first camera comprises a camera comprised in another electronic device, based on that the electronic device is wiredly or wirelessly connected with the other electronic device, and wherein the first AR object is related with an object identified through the camera comprised in the other electronic device.

* * * * *